United States Patent [19]

Nishida

[11] Patent Number: 5,450,126
[45] Date of Patent: Sep. 12, 1995

[54] IMAGE BLUR CORRECTING APPARATUS

[75] Inventor: Yoshihiro Nishida, Nagaokakyo, Japan

[73] Assignee: Mitsubishi Denki Kabushiki Kaisha, Tokyo, Japan

[21] Appl. No.: 979,779

[22] Filed: Nov. 20, 1992

Related U.S. Application Data

[60] Division of Ser. No. 758,546, Sep. 9, 1991, Pat. No. 5,189,518, which is a continuation of Ser. No. 597,683, Oct. 16, 1990, abandoned.

[30] Foreign Application Priority Data

| Oct. 17, 1989 | [JP] | Japan | 1-271032 |
|---|---|---|---|
| Oct. 24, 1989 | [JP] | Japan | 1-277539 |
| Mar. 9, 1990 | [JP] | Japan | 2-58851 |
| Jun. 8, 1990 | [JP] | Japan | 2-150595 |

[51] Int. Cl.⁶ ........................... H04N 5/232
[52] U.S. Cl. ......................... 348/208; 348/699
[58] Field of Search .................. 348/208, 699; H04N 5/232

[56] References Cited

U.S. PATENT DOCUMENTS

| 3,561,870 | 2/1971 | Redpath | 348/208 |
|---|---|---|---|
| 4,612,575 | 9/1986 | Ishman | 348/208 |
| 4,713,697 | 4/1986 | Gotou et al. | 348/208 |
| 4,774,589 | 5/1986 | Rowland | 348/208 |
| 4,858,128 | 8/1989 | Nowak | 382/6 |
| 4,959,725 | 9/1990 | Mandle | 348/208 |

FOREIGN PATENT DOCUMENTS

| 200442 | 11/1986 | European Pat. Off. |
|---|---|---|
| 332169 | 9/1989 | European Pat. Off. |
| 0393823 | 3/1990 | European Pat. Off. |
| 0406074 | 6/1990 | European Pat. Off. |
| 2165417 | 4/1986 | United Kingdom |
| 2172171 | 9/1986 | United Kingdom |
| 2187913 | 9/1987 | United Kingdom |
| 2194870 | 3/1988 | United Kingdom |
| 2234409 | 1/1991 | United Kingdom |
| WO7900260 | 5/1979 | WIPO |

OTHER PUBLICATIONS

Japanese Laid-Open Patent Publication No. 63-166369, to Yoshihide Kawamura; entitled "Moving Vector Detecting Circuit", dated Jul. 9, 1988.

ITEJ Technical Report, vol. 11, No. 3, entitled "The Electronic Picture Stabilizer", dated May 1987; pp. 43-48.

Primary Examiner—Howard W. Britton

[57] ABSTRACT

An image blur correcting apparatus includes a lens-barrel part having a lens and an imaging device, an image signal processing device for forming a video signal from an electrical signal obtained at the imaging device, a supporting body for supporting the lens-barrel part in a freely pivoting manner around a rotation axis crossing a beam axis incident to the lens-barrel part at approximately right angles, and an actuator device attached between the lens-barrel part and the supporting body for rotating the lens-barrel part. The apparatus further includes a relative angle detecting device for detecting a relative angle between the lens-barrel part and the supporting body and a device for detecting a moving vector indicating an amount of blur of the image from correlation between two frames of image information from the image signal processing means, which are continuous in view of time. Finally, the device includes an angular velocity accumulating device for calculating rotating angular velocity using a zoom multiplying factor or the like from the detected result of the moving vector.

58 Claims, 17 Drawing Sheets

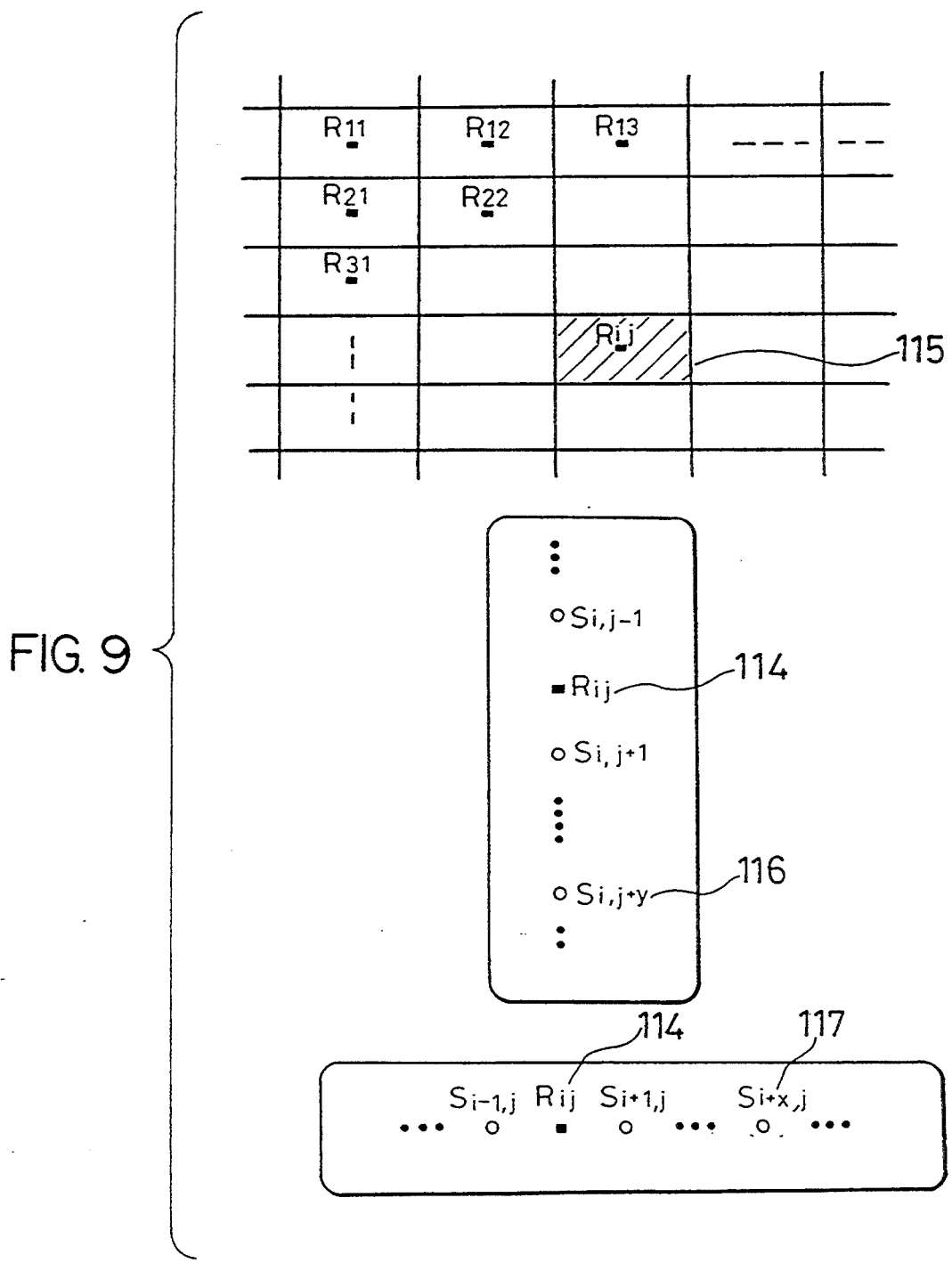

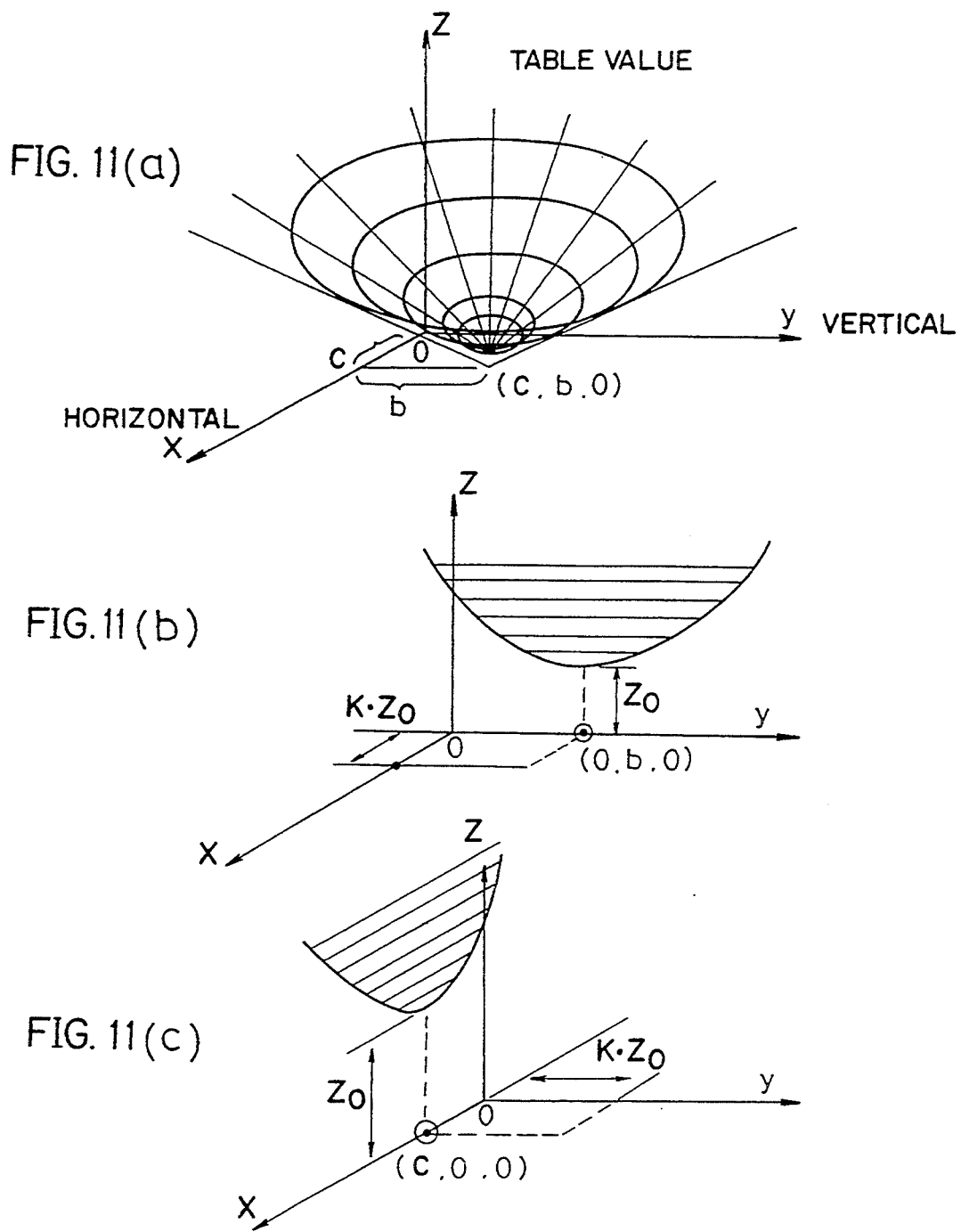

FIG. 15(a)

| a AREA (2,2) | b AREA (2,3) | c AREA (2,2) |
|---|---|---|
| d AREA (2,2) | e AREA (1,2) | f AREA (2,3) |
| g AREA (2,1) | h AREA (2,1) | i AREA (3,2) |

AVERAGE (2,2)

FIG. 15(b)

| a AREA (3,−2) | b AREA (0,−2) | c AREA (−2,−3) |
|---|---|---|
| d AREA (2,0) | e AREA (1,0) | f AREA (−1,1) |
| g AREA (2,2) | h AREA (1,2) | i AREA (−1,2) |

AVERAGE (5/9, 0)

IMAGE BLUR CORRECTING APPARATUS

This application is a divisional of application Ser. No. 07/758,546, filed on Sep. 9, 1991, now U.S. Pat. No. 5,189,518, which is a continuation of application Ser. No. 07/597,683, filed Oct. 16, 1990, now abandoned, the entire contents of which are hereby incorporated by reference.

FIELD OF THE INVENTION

The present invention relates to an image blur correcting apparatus which corrects a screen blur in an imaging apparatus such as a miniature camera. More particularly it relates to a portable video camera.

BACKGROUND OF THE INVENTION

A blur of an image in a screen such as a television screen is caused by movement of a subject while it is imaged and by parallel movement (pan) of a camera in general. In addition, movement of the image caused by vibration of the camera or the like according to the condition of shooting also sometimes causes the blur. For example, in case of telescopic shooting, since an angle of view is small, only small vibration causes large blur in the image, which causes a visual hindrance. In addition, when a user shoots scenes with a video camera in his hand while moving or he is in a helicopter or the like, vibration of the camera also causes the blur of the screen.

As measures against the above, a blur proofing apparatus using a gyro sensor is provided. This apparatus moves a position or an optical axis in the reverse direction by an amount of displacement detected by the gyro sensor to control and correct it.

Meanwhile, it is proposed that the blur is corrected by electrically processing the image information.

FIG. 6 is a block diagram showing a general structure of a conventional image blur correcting apparatus in which the image information is electrically processed. In FIG. 6, reference numeral 601 designates an analog/digital converter (referred to as an A/D converter hereinafter), reference numeral 602 designates a memory which writes and reads an input signal, reference numeral 12 designates a moving vector detecting circuit which detects a direction and size of blur of the input signal, reference numeral 603 designates a memory reading control circuit which controls a readout address of the memory 602 in accordance with the movement from the moving vector detecting circuit 12, reference numeral 604 designates an interpolation circuit which expands and interpolates a part of a video signal read from the memory 602 and reference numeral 605 designates a digital/analog converter (referred to as a D/A converter hereinafter).

Next, a blur correcting operation of this structure will be described hereinafter.

The input video signal is sampled at a constant sampling frequency and converted to a digital signal by the A/D converter 601 and then it is written in the memory 602.

In addition, the moving vector detecting circuit 12 detects movement (speed) in each frame from the correlation between continuous frames. The memory reading control circuit 603 reads a part of signals written in the memory 602 by moving a reference point (readout address) in accordance with an amount of movement obtained by the moving vector detecting circuit 12. The read signal is expanded and interpolated to an original screen size by the interpolation circuit 604 and then converted to a video signal by the D/A converter 605 and then it is output.

FIG. 7 is a view in which a signal is read from the memory 602 by moving the reference point. Reference character W designates a region in which the input signal is written in the memory, which is always constant. Reference character $R_0$ is a region in which a signal is read from the memory when an amount of movement is 0. Further, reference character $R_{xy}$ is a region in which a signal is read from the memory when the amount of movement is x in the horizontal direction and y in the vertical direction. The amount of movement can be obtained by integrating the movement (speed) in each frame which is found during the moving vector detection. Thus, accumulation of errors caused by the integration can be prevented by bringing the readout region to the $R_0$ in stable time.

Meanwhile, in this image blur correcting apparatus, it is ideal to calculate how far and in which direction each pixel in the image moved, to detect the amount of blur of the image between frames and this method shows the best precision in vector detection. However, it requires a large-scale hardware and takes a lot of time. Thus it is difficult to realize the above method. Thus, there is a general method for determining the moving vector in the whole screen by finding an amount of movement of several pixels (referred to as representative points hereinafter) in the screen.

FIG. 16 is a block diagram showing a general representative point calculating circuit. FIGS. 17A and 17B illustrate the relationship between a block in the image and a representative point in a conventional example. The image of one field is divided into the prescribed number of blocks 115 and one representative point $R_{ij}$ 114 is provided in the center of each block. The level difference between the representative point in the previous frame and the whole pixels $S_{i+x,j+y}$ 116 in the block is calculated in each block.

Referring to FIG. 16, an input video signal (a) is A/D converted by the A/D converter 101 and then a prescribed pixel to become the representative point 114 in the block 115 is written in the representative point memory 103 through a latch circuit 102. Data stored in the representative point memory 103 is read one frame later and applied to an absolute value circuit 106 through a latch circuit 104. On the other hand, the other A/D converted data of the video signal is applied to the absolute value circuit 106 through a latch circuit 105. The absolute value of the difference between the representative point signal (b) of the previous frame output from the latch circuit 104 and the pixel signal (c) of the present frame is calculated by the absolute value circuit 106. This calculation is made in each block and an output signal (d) from the absolute value circuit 106 is added one after another to tables corresponding to the same address of the pixel in each block of the accumulated addition table 108. The result of addition in the tables is input to a table value comparator 109 and finally it is determined how far and in which direction the image position moved for one frame, that is, a moving vector value (e) is determined from an address in which the result of addition is the minimum. More specifically, the absolute value of the difference between the representative point $R_{ij}$ and a signal $S_{i+x,j+y}$ positioned in a horizontal direction x and a vertical direction y is found. It is then is added to x and y of the same position to each representative point and is then set as $D_{xy}$. At this time, the $D_{xy}$ is represented as follows;

$$D_{xy} = \Sigma |R_{ij} - S_{i+x, j+y}|$$

Then, the minimum x and y in the $D_{xy}$ are set as moving vectors in the horizontal direction and vertical direction, respectively.

At this time, one block in which the representative point is positioned at the center thereof shows a size of the vector, that is, a range in which the vector can correct the image. In addition, in view of the accumulated addition, the more the number of additions is, the more the precision of detecting the vector is improved. Thus, the moving vector is obtained by adding the representative points in the whole screen, that is, averaging the movement of the whole screen.

Although the conventional imaging apparatus has the above structure in which the gyro sensor is used for detecting blur, the sensor is expensive and it is necessary to determine a position of the sensor and also to secure a space therefor.

In addition, in order to prevent the image from being degraded, an A/D converter and a D/A converter with high precision, a memory with large capacity and a large-scale circuit for memory control or expansion and interpolation are. The result is that the system costs a lot and also current consumption becomes large. In addition, since the corrected signal is a part of the continuously input signals, an amount of information is reduced and resolution of that signal is low. If a range of correction is increased in order to correct blur, the amount of information is further reduced and the resolution is also lowered. Therefore, the range of correction can not be increased so much.

In addition, according to the above structure of the moving vector detecting circuit, since the moving vector is found in a plane manner (two dimensionally), the accumulated addition tables whose number corresponds to the number of whole pixels in the block are necessary. For example, if the number of the pixels are 32 in the horizontal direction and 16 in the vertical direction, 512 (=32×16) accumulated addition tables are necessary, with the result being that the scale of the circuit is increased. In addition, when the moving vector is calculated, whole data in the accumulated addition tables are compared, with the result being that the number of times of comparison is very large and also it takes a lot of time.

In addition, according to the moving vector detecting apparatus in the above conventional image blur correcting apparatus, movement over the whole screen is averaged, so that arrangement of the blocks for detecting the moving vector is not always symmetrical about the center of the screen. Therefore, although the moving vector can be well detected when the image only moves in parallel, the moving vector often can not be detected when the image is zoomed in or out. In addition, when the vector is wrongly detected, it is more conspicuous at the time of zooming operation than that at the time of parallel movement, which looks strange for the user.

SUMMARY OF THE INVENTION

The present invention was made to solve the above problems and it is an object of the present invention to provide an inexpensive, small and light image blur correcting apparatus having a function of preventing a blur.

It is an another object of the present invention to provide an image blur correcting apparatus having a small moving vector detecting circuit capable of detecting a moving vector in a short calculating time.

It is a further object of the present invention to provide an image blur correcting apparatus having a moving vector detecting circuit capable of detecting a moving vector which does not look strange for a user when zooming operation, which is often used at the time of shooting by a video camera, is performed.

Other object and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to a first aspect of the present invention, an image blur correcting apparatus comprises a lens-barrel part, including having a plurality of lenses and an imaging device; image signal processing means for forming an image signal from an electrical signal obtained at the imaging device; a supporting body for supporting the lens-barrel part in a freely pivoting manner around a rotating axis crossing a beam axis incident to the lens-barrel part at approximately right angles; actuator means, attached between the lens-barrel part and the supporting body, for rotating the lens-barrel part; relative angle detecting means for detecting a relative angle between the lens-barrel part and the supporting body; means for detecting a moving vector indicating an amount of blur of the image from the correlation between two frames of image information from the image signal processing means which are continuous in view of time; angular velocity operating means for calculating rotation angular velocity using a zoom multiplying factor from the detected moving vector; and calculation controlling means for outputting a control signal of an actuator in accordance with the calculated rotation angular velocity and detected relative angle.

According to a second aspect of the present invention, in an image blur correcting apparatus, moving vectors of the whole screen are detected from an amount of movement of a pixel in each block on the basis of representative points set in a plurality of blocks in an image, in order to detect an amount of movement between frames of the image. This image blur correcting apparatus comprises means for calculating an absolute value of the difference between the pixel of a representative point for each block of the frame directly, before a frame whose movement vector is to be detected, and the pixels on a horizontal straight line and a vertical straight line passing through the representative point, respectively, of the frame whose movement vector is to be detected. It further includes horizontal and vertical accumulated addition devices (tables) for accumulatedly adding the horizontal and vertical absolute values calculated and, means for detecting two intersecting one-dimensional moving vectors from the horizontal and vertical accumulated added values. Finally, it includes means for calculating a two-dimensional moving vector from the two intersecting one-dimensional moving vectors.

According to a third aspect of the present invention, an image blur correcting apparatus comprises means for finding an absolute value of difference between two continuous frames, at each block, after one screen is divided into a plurality of blocks, means for calculating tables by adding the absolute value of the difference in each block over each area after one screen is divided into a plurality of areas including the plurality of blocks. Means for finding a moving vector for each area from the above table in each area and means for determining one of the whole screen moving in parallel and the whole screen zooms in or out from the obtained moving vector for each area. Finally, it includes means for outputting the moving vector, having a value obtained by averaging the moving vectors of the whole screen when the whole screen moving in parallel is determined and for outputting the moving vector having a value obtained by multiplying an average value of the whole screen by a prescribed attenuation constant k ($0 \leq k < 1$) when the zooming operation is determined.

According to the above structure of the present invention, the moving vector of the image is detected directly from the video signal and rotation angular velocity is calculated by a zoom multiplying factor or the like. Further, the blur is corrected by driving the actuator to form a closed loop, and a relative angle between the lens-barrel part and the supporting body is detected and the actuator is driven so that the above angle may be zero in a low frequency region. Therefore, the blur of the image can be corrected independent of the zoom multiplying factor, and the lens-barrel part can be controlled so as to return to the reference position of the supporting body in normal time.

In addition, according to the image blur correcting apparatus having the above structure, since only two intersecting one-dimensional vectors are found from the accumulated addition tables, the number of the accumulated addition tables can be the sum of the number of pixels in the horizontal direction and the number of pixels in the vertical direction. For example, if the number of pixels in the horizontal direction is 32 and that in the vertical direction is 16 in a block, the number of the accumulated addition tables is only 48 (=32+16). Thus the accumulated addition table can be implemented by circuits whose scale is one tenth or less as large as the conventional one. In addition, time required for calculating the moving vector can be reduced when the number of the accumulated addition tables is reduced.

Furthermore, according to the present invention, the movement in the whole screen is found, not by averaging it, but by detecting a moving vector a every area, obtained by dividing the screen and determining whether the whole screen moves in parallel or it is in course of the zooming operation from a fact that the moving vector in each area is directed in the same direction or from a fact that they are directed in opposite directions. As a result, even when the zooming operation is determined, the user can detect the moving vector which does not look strange for him.

BRIEF DESCRIPTION OF THE DRAWINGS

FIG. 9 shows the relationship between a block and a representative point in an image during the representative point calculation shown in FIG. 8;

FIGS. 10a-10c and 11a-11c are schematic views showing accumulated addition tables;

FIGS. 15a and 15b are views for describing operation of parallel movement/zooming operation determining process;

DESCRIPTION OF THE PREFERRED EMBODIMENT

Figure 1:
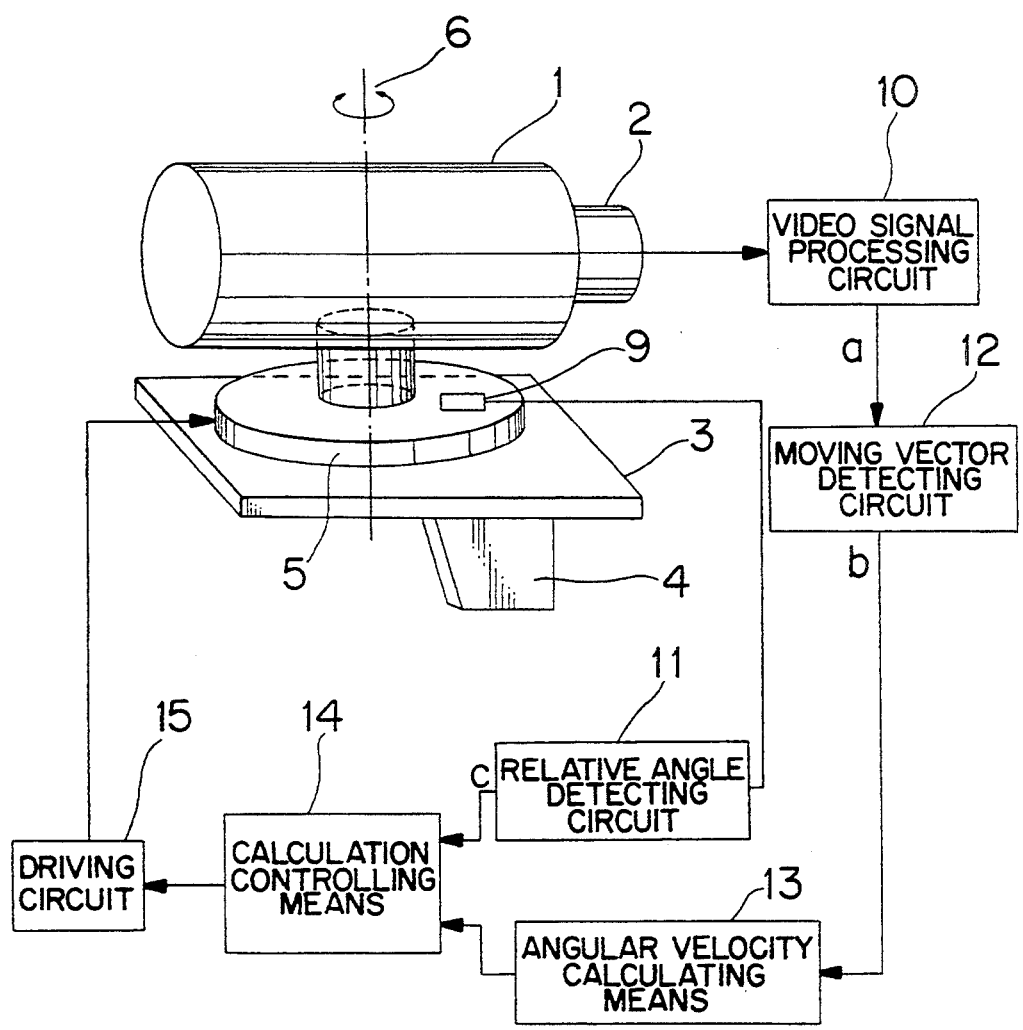
FIG. 1 is a view showing an image blur correcting apparatus in accordance with an embodiment of the present invention.

An embodiment of the present invention will be described in detail, with reference to the drawings, hereinafter. FIG. 1 is a view showing a structure of an image blur correcting apparatus in accordance with a first embodiment of the present invention. In FIG. 1, a plurality of lenses (not shown) and an imaging device 2 (for example a CCD plate or an image pickup tube) are attached to a lens-barrel part 1, in which reflected light from a subject is converged, and image is formed at the imaging device 2 and converted to an electric charge signal (electric signal). Then, a video signal processing circuit 10 reads electric charge signals one after another, and forms a video signal.

An actuator 5 is arranged between the lens-barrel part 1 and a supporting body 3 and rotates the lens-barrel part 1 around a rotation axis 6 in the yaw direction (the lens-barrel part 1 can freely pivot on an almost horizontal surface when it is used).

The rotation axis 6 of the actuator 5 passes through the center of gravity G of the lens-barrel part 1 and is rotatably supported by the supporting body 3. In addition, a grip 4 of the imaging apparatus held by the user is provided on the supporting body 3.

Reference numeral 11 designates a relative angle detecting circuit which detects a relative angle between the lens-barrel part 1 and the supporting body 3 from an output of a Hall element 9. Reference numeral 12 designates a moving vector detecting circuit which detects a moving vector from the video signal formed by the video signal processing circuit 10. Further, reference numeral 13 designates an angular velocity calculating device for calculating rotation angular velocity of the lens-barrel part 1 by a zoom multiplying factor or the like from the output of the moving vector detecting circuit 12. Finally reference numeral 14 designates a calculation controlling device, to which the Outputs of the relative angle detecting circuit 11 and the angular velocity calculating device 13 are input, for controlling the actuator 5 through the driving circuit 15.

Figure 2A:
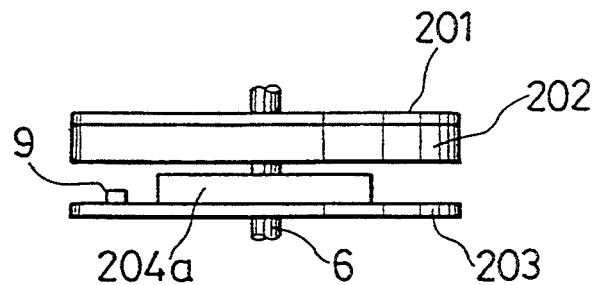
FIGS. 2a-2c illustrate a specific structure of an actuator shown in FIG. 1.
Figure 2B:
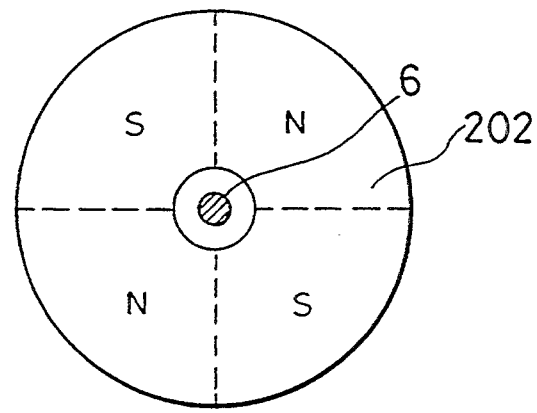
Figure 2C:
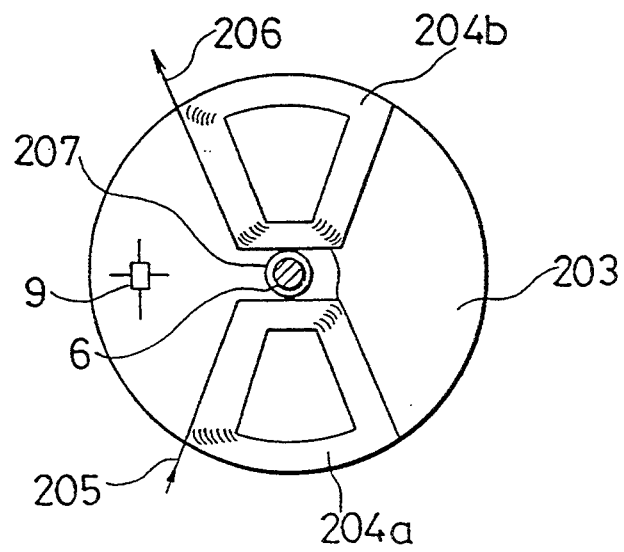

FIG. 2(a), (b) and (c) are views each showing a structure of the actuator 5 in detail. In FIGS. 2(a)–(c), a back yoke 201, which is made of ferromagnetic material, of a magnet 202 is attached to the lens-barrel part 1 and rotates together with the rotation axis 6. The magnet 202 is magnetized so as to have four magnetic poles and generates a field magnetic flux. Coils 204a and 204b and a Hall element (magnetic sensor) 9 are fixed to the coil yoke 203a to which a bearing 207 of the rotation axis 6 is attached.

According to the embodiment of the present invention, the magnet 202 is attached to the lens-barrel part 1 and the coil yoke 203 is attached to the supporting body 3. The coil 204a is connected to the coil 204b in series and a rotating torque is generated by a current flowing from a terminal 205 to a terminal 206 and the magnetic flux of the magnet 205. In addition, the Hall element 9 is arranged in a part opposite to a part in which the magnetic pole of the magnet 202 is switched, and generates an output signal corresponding to the relative difference of angles between the magnet 202 (an angle of the lens-barrel) and the-coil yoke 203 (an angle of the supporting body). The output of the Hall element 9 which detects the magnetic field of the magnet 202 of the actuator 5 is input to a relative angle detecting circuit 11.

Figure 3:
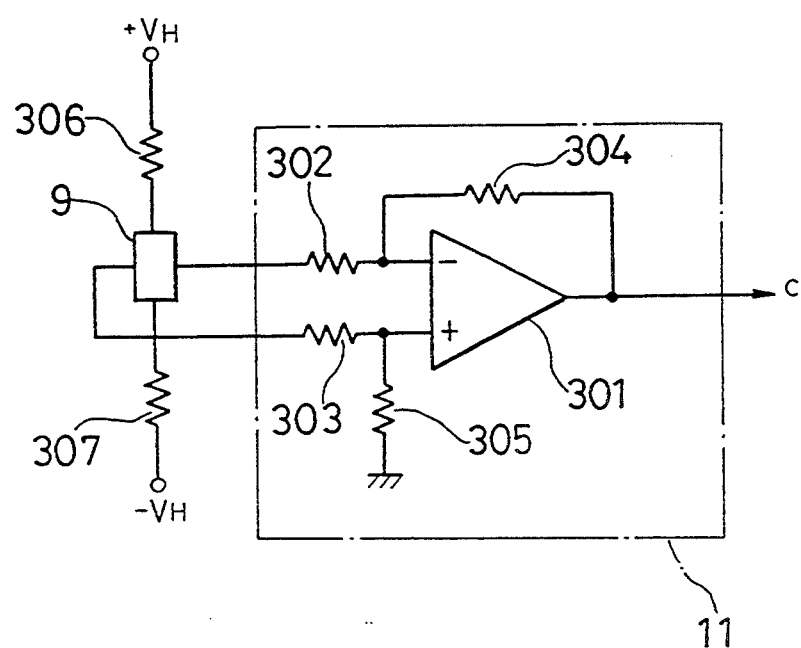
FIG. 3 is a view showing a specific structure of a relative angle detecting circuit shown in FIG. 1.

FIG. 3 is a view showing a structure of the relative angle detecting circuit 11 in detail. DC signals obtained at two output terminals of the Hall element 9 are differentially amplified by a prescribed number times by a differential amplifying circuit including an operational amplifier 301 and resistors 302, 303, 304 and 305, whereby an output signal (c) is provided. Voltages of +VH and −VH are appropriate voltages, which apply appropriate bias to the Hall element 9 through resistors 306 and 307.

Figure 4:
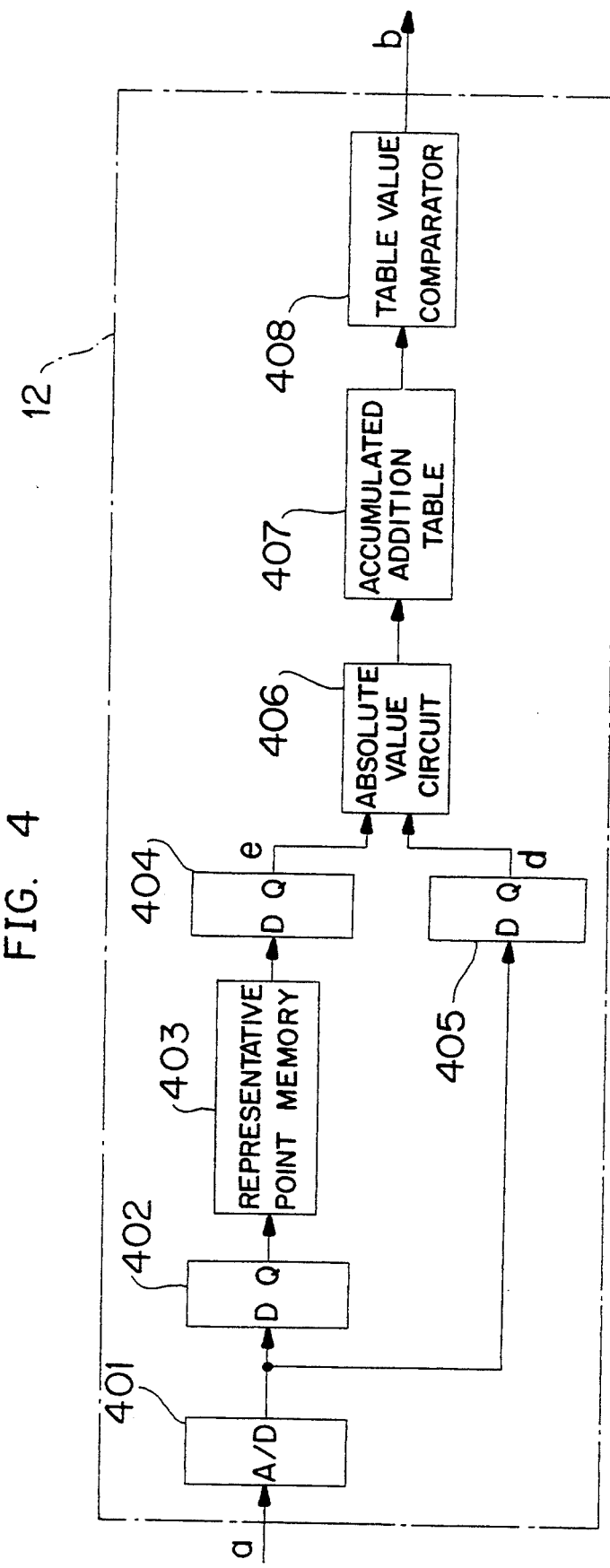
FIG. 4 is a block diagram showing a structure of a moving vector detecting circuit shown in FIG. 1.

FIG. 4 is a block diagram showing an example of the moving vector detecting circuit 12. In FIG. 4, an input video signal (a) is generated by the video signal processing circuit 10 and A/D converted by an A/D converter 401. Then, one of the A/D converted signals is input to a representative point memory 403 through a latch circuit 402. A prescribed pixel in a block written in this memory is set as a representative point. Therefore, the output of the representative memory 403 is the representative point written one frame before, which is read every block and becomes a signal (e) through the latch circuit 404. The other video signal input to this block is A/D converted and then becomes a signal (d) through the latch circuit 405. Then, the absolute value of the difference between the signal (d) and the representative point signal (e) is calculated by the absolute value circuit 406. This calculation is performed for every block whose number is the same as that of the representative points, and its output signals are added one after another to tables corresponding to the same address of each block of an accumulated addition table device 207. The result of the tables is input to a table value comparator 408 and then it is found out how far, and in which direction, the image position moved for one frame from an address in which the result of addition is the minimum at a final stage. More specifically, a vector value (b) is found.

Figure 5:
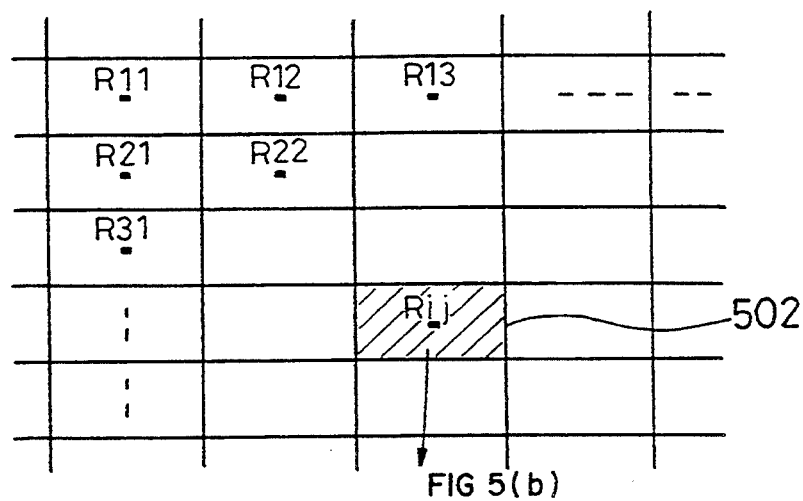
FIGS. 5a and 5b shows the relation of positions between an screen and a representative point during the calculating operation shown in FIG. 4.
Figure 5:
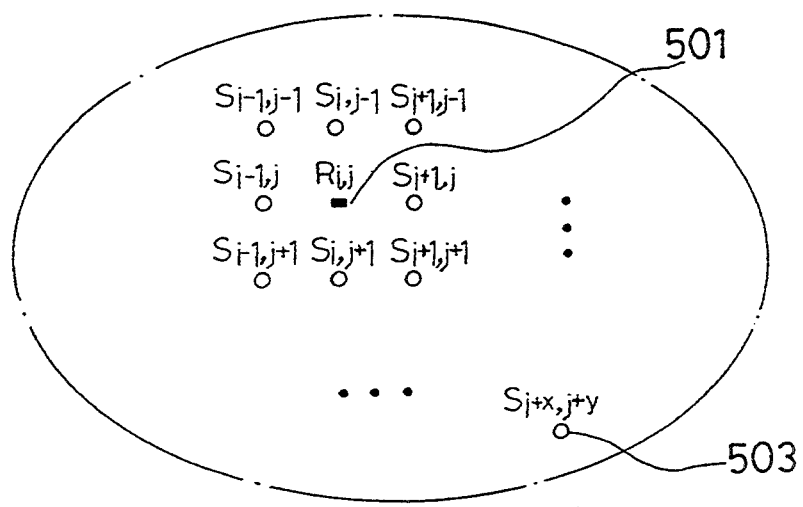
Figure 6:
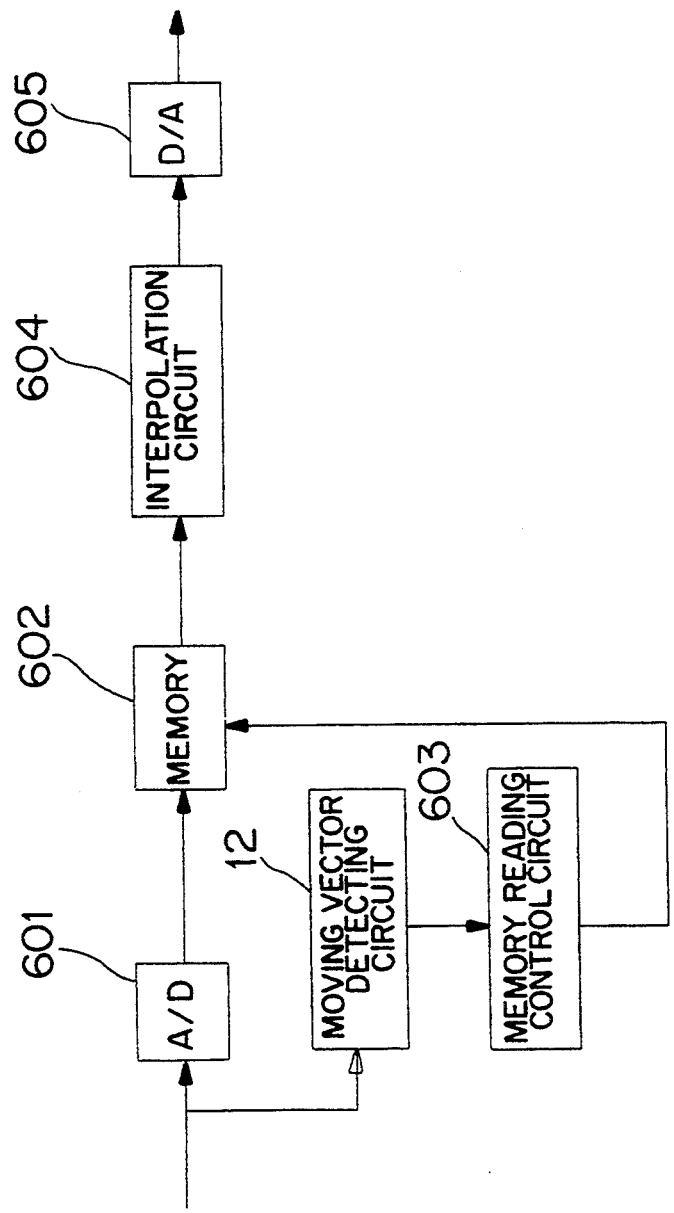
FIG. 6 is a block diagram showing a structure of a conventional image blur correcting apparatus which performs electrical processing.
Figure 7:
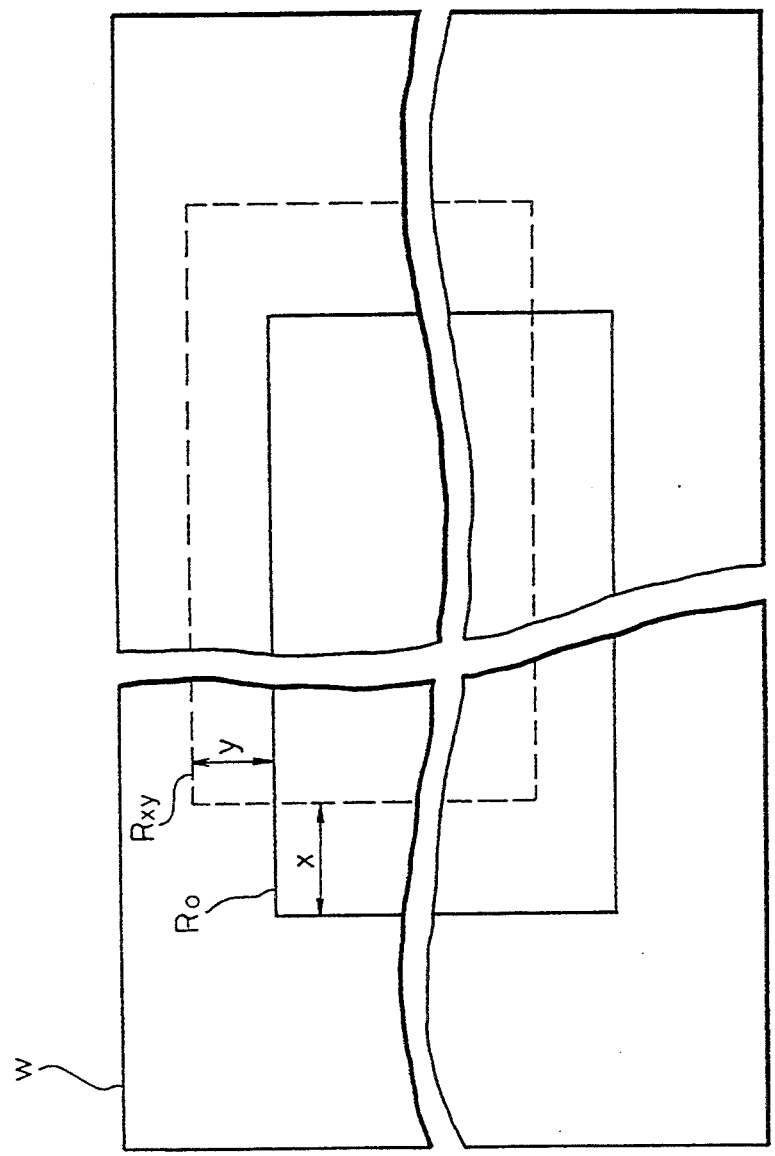
FIG. 7 is a view showing regions in which a signal is written and read, into and from a memory, respectively, in the apparatus.

FIGS. 5(a)–(b) show the relationship between a block of the image and its representative point during general representative point calculation described above, in which it is shown that calculation is made between a pixel 503 input to the block 502 and a representative point level in each block in view of the representative point 501 taken out one frame before.

More specifically, the absolute value of the difference between the representative point $R_{ij}$ and a signal $S_{i+x, j+y}$ positioned apart in a horizontal direction by x and in a vertical direction by y from that is added for each representative point and then it is set as $D_{xy}$. At this time, the $D_{xy}$ is represented as follows;

$$D_{xy} = \sum_{ij} |R_{ij} - S_{i+x, j+y}|$$

Then, the minimum x and y in the $D_{xy}$ are set as moving vectors in the horizontal direction and vertical direction, respectively.

At this time, one block in which the representative point is positioned at the center thereof shows a size of the vector, that is, a range in which the image can be corrected by the vector. In addition, in view of the accumulated addition, the more the number of additions is, the more precision of detecting the vector is improved. Thus, the moving vector is obtained by adding the representative points in the whole screen, that is, averaging the movement of the whole screen.

Next, a control loop will be described hereinafter. When a hand of the user holding the grip 4 rotates at certain speed, the lens-barrel part 1 also rotates at the same speed. When the lens-barrel part 1 rotates, the video signal output from the image signal processing circuit 10 moves in the left direction in parallel and the image of the representative point in the previous frame moves in the left direction by n pixels in the next frame. Then, the absolute value of the output of an absolute value circuit 406 in the moving vector detecting circuit 12 is less than that on the left by n pixels. Therefore, the accumulated addition table 407, in which the absolute value in each block is accumulated, is less than the table corresponding to the address on the left side by n pixels. Then, it is found that the moving vector has a size of n pixels/frame in the left direction. The rotating angular velocity of the lens-barrel part 1 at this time is calculated by the angular velocity operating device from the thus obtained moving vector and a zoom ratio (when the zoom ratio is large (small), the angular, velocity is calculated on a large (small) scale and then the actuator 5 is driven so that this angular velocity may be zero.

However, oscillation or deviation is generated by way of only the angular velocity control loop. In addition, although the angle can be detected by integrating the detected angular velocity, a detection error is also accumulated at this time. Then, the actuator 5 is controlled so that the relative angle obtained from the relative angle detecting circuit 11 may be zero in a low frequency region. Thus, the blur of the image can be corrected by two loops independent of the zoom ratio and the lens-barrel part is controlled so as to return to the reference position of the supporting body in normal time.

Although a description was given of the embodiment in which the blur in a yaw direction is prevented, it is needless to say that the present invention can prevent blur in a pitch direction.

In addition, although the relative angle is detected by the Hall element attached to the actuator in the above embodiment, any sensor can be used if it can detect the angle between the lens-barrel part and the supporting body.

In addition, this image blur correcting apparatus is used not only in the video camera, but also in various apparatuses within a principle of the present invention.

Meanwhile, although the moving vector detecting circuit shown in FIG. 4 is used in the image blur correcting apparatus shown in FIG. 1, the circuit shown in FIG. 4 is large in scale and it takes time to calculate the moving vector therein.

Figure 8:
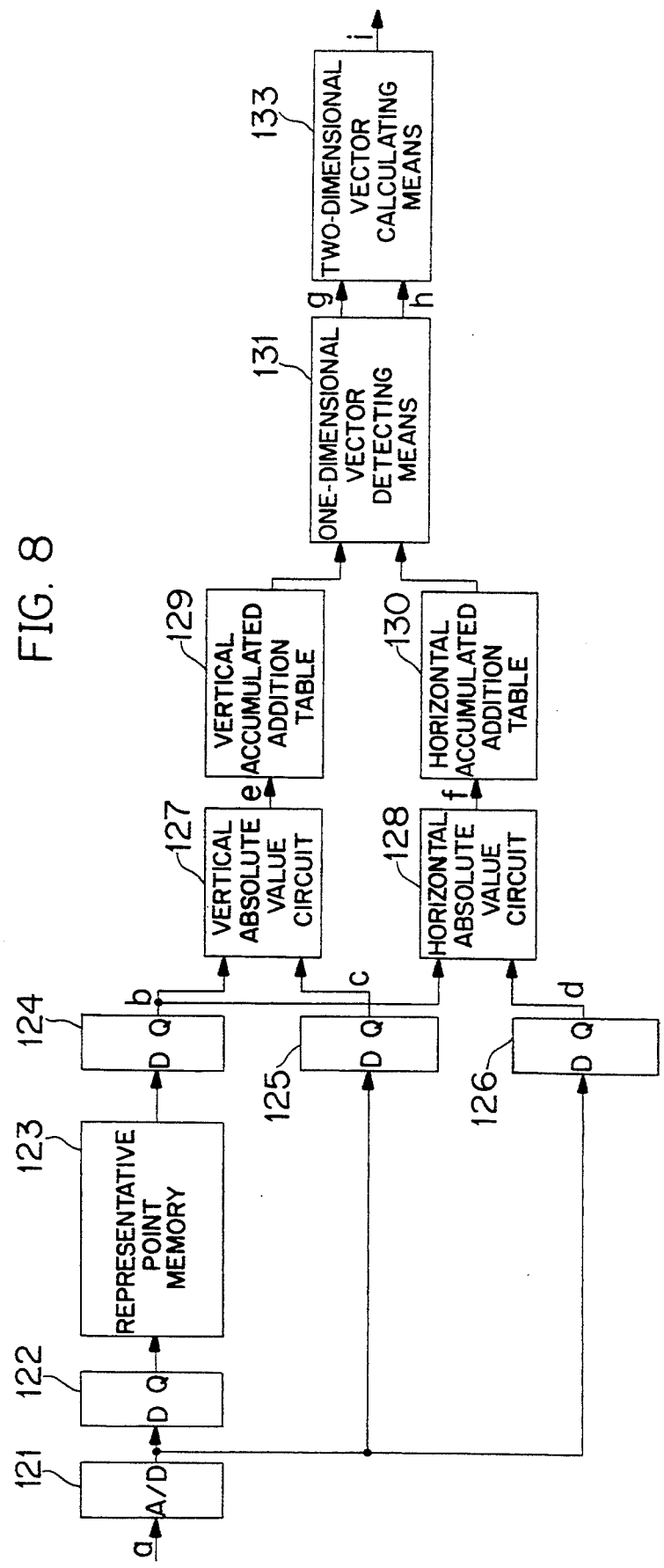
FIG. 8 is a block diagram showing a representative point calculating circuit in accordance with a second embodiment of the present invention.

FIG. 8 is a block diagram showing a representative point calculating circuit in an image blur correcting apparatus in accordance with a second embodiment of the present invention, which can solve the above problems.

FIG. 9 is a view showing the relationship between the block of the image and the representative point in the embodiment of FIG. 8.

According to the apparatus shown in FIG. 8, the image of one field is divided into prescribed number of blocks 115 and one representative point $R_{ij}$ 114 is provided at the center of each block. The level difference between the representative point in the previous frame and a pixel $S_{i+x, j+y}$ 116 in the vertical direction of the representative point and a pixel $S_{i+x, j+y}$ 117 in the horizontal direction of the representative point in the block is calculated for every block.

In FIG. 8, an input video signal (a) is A/D converted by an A/D converter 121 and then a prescribed pixel in the block 115, to become the representative point 114, is written in a representative point memory 123 through a latch circuit 122. Data stored in the representative point memory 123 is read one frame after and then applied to a vertical absolute value circuit 127 and a horizontal absolute value circuit 128 through the latch circuit 124. On the other hand, the data of the A/D converted video signal is applied to the vertical absolute value circuit 127 through a vertical pixel latch circuit 125, which latches at a timing corresponding to the pixel in the vertical direction of the representative point and also applied to the horizontal absolute value circuit 128 through a horizontal pixel latch circuit 126 which latches at a timing corresponding to the pixel in the horizontal direction of the representative point.

A representative point signal (b) in the previous frame which is output from the latch circuit 124 and a pixel signal (c) in the present frame which is output from the vertical pixel latch circuit 125 are calculated at the vertical absolute value circuit 127 to find the absolute value of the difference between them. A representative point signal (b) in the previous frame which is output from the latch circuit 124 and the pixel signal (d) in the present frame which is output from the horizontal pixel latch circuit 126, are calculated at the horizontal absolute value circuit 128 to find the absolute value of the difference between them. These calculations are performed every block and an output signal (e) from the vertical absolute value circuit 127 is added one after another to tables corresponding to the same address of the pixel in each block in the vertical accumulated addition table 129, and an output signal (f) from the horizontal absolute value circuit 128 is added one after another to tables corresponding to the same address of the pixel in each block in the horizontal accumulated addition table 130. The result of the horizontal accumulated addition table 130 and the result of the vertical accumulated addition table 129 are input to one-dimensional vector detecting device 131. Then a vertical moving vector (g) and a horizontal moving vector (h) are detected therein. The vertical moving vector (g) and the horizontal moving vector (h), which are two intersecting one-dimensional vectors, are input to two-dimensional vector calculating device 133. It is then found how far and in which direction the image position moved for one frame at the final stage, that is, a two-dimensional moving vector value (i) is determined.

At this time, one block in which the representative point is positioned at the center thereof shows a size of the vector, that is, a range in which the vector can correct the image. In addition, in view of the accumulated addition, the more the number of additions is, the more precision of detecting the vector is improved. Thus, the moving vector is obtained by adding the representative points in the whole screen, that is, averaging the movement of the whole screen.

Figure 10A:
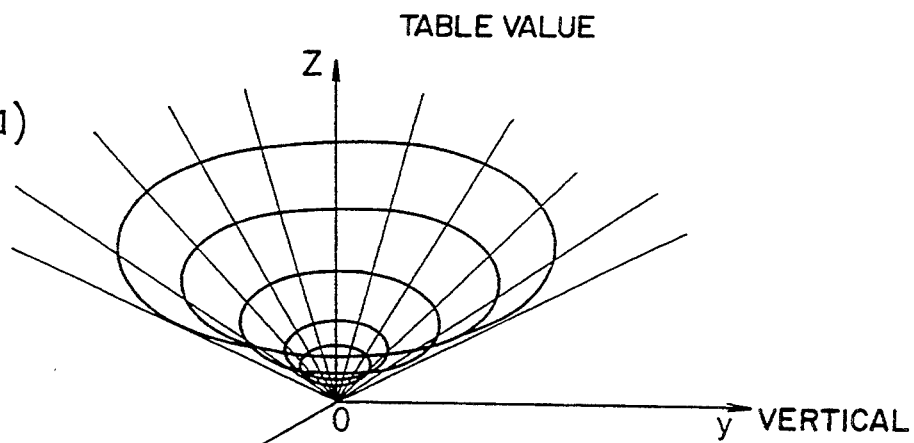
Figure 10B:
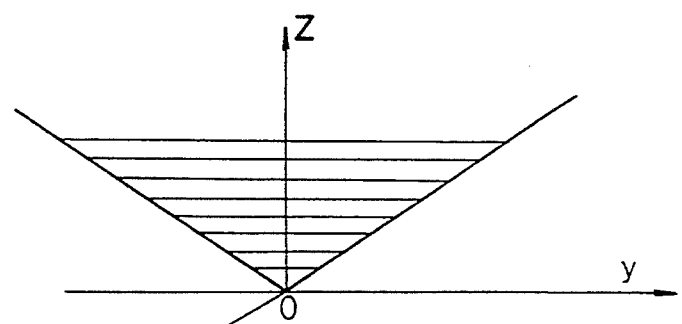
Figure 10C:
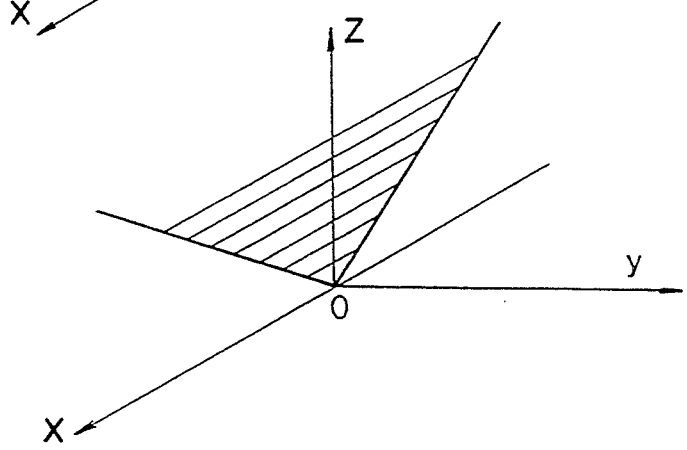

Next, the one-dimensional vector detecting device 131 will be described. FIGS. 10(a)-(c) and 11(a)-(c) are schematic views showing the accumulated addition table for describing the one-dimensional vector detection. FIGS. 10(a) and 11(a) show the accumulated addition table corresponding to the whole number of pixels in the block in which a horizontal direction (x), a vertical direction (y) and a value of the accumulated addition table (z) are represented by three dimensions with the representative point as the origin. In addition, FIGS. 10(b) and 11(b) show a vertical accumulated addition table $D_y$ obtained by finding the absolute value of the difference between the representative point $R_{ij}$ and a signal $S_{i, j+y}$ positioned in the vertical direction y thereof, and adding the same over those at the same position y relation with respect to each representative point, in which the vertical direction (y) and the value of the accumulated addition table (z) are represented by two dimensions with the representative point as the origin. FIGS. 10(c) and 11(c) show a horizontal accumulated addition table $D_x$ obtained by finding the absolute value of the difference between the representative point $R_{ij}$ and a signal $S_{i+x, j}$ positioned apart from that in the horizontal direction by x, and adding the same over those at the same position x relation with respect to each representative point, in which the horizontal direction (x) and the value of the accumulated addition table (z) are represented by two dimensions with the representative point as the origin.

At this time, they are represented by the following equations, that is;

$$D_x = \Sigma |R_{ij} - S_{i+x, j+y}|$$

$$D_y = \Sigma |R_{ij} - S_{i+x, j+y}|$$

Then, a horizontal moving vector (h) and a vertical moving vector (g) are detected by using the $D_x$ and $D_y$.

First, a description will be given of a first detecting method in which the minimum value x in the horizontal accumulated addition table $D_x$ is detected as the horizontal moving vector (h) and the minimum value y in the vertical accumulated addition table $D_y$ is detected as the vertical moving vector (g).

If the video signal in which correlation in both horizontal and vertical directions is reduced in proportion to a distance is at a standstill, the accumulated addition table value is in the form of an inverted cone with the origin (0, 0, 0) as an apex as shown in FIG. 10(a). At this time, the value of the vertical accumulated addition table 9 shown in FIG. 10(b) is the minimum when y=0 and the value of the horizontal accumulated addition table 10 is the minimum when x=0. Therefore, it is found that the vertical moving vector and the horizontal moving vector are both 0 vector.

Then, if the video signal moves by c in the horizontal direction and by b in the vertical direction for one frame, the accumulated addition table is in the form of the inverted cone with (c, b, 0) as an apex shown in FIG. 11(a). At this time, the vertical accumulated addition table 9 is the value of a section of the cone as shown in FIG. 11(b) when a plane x=0 and the horizontal accumulated addition table 10 is the value of a section of the cone as shown in FIG. 11(c) when a plane y=0. Then, as can be seen from FIG. 11(b), the value of the vertical accumulated addition table 9 is the minimum when y=b. Also, as can be seen from FIG. 11(c), the value of the horizontal accumulated addition table 10 is the minimum when x=c. Therefore, it is found that the vertical moving vector (g) is (0, b) and the horizontal moving vector (h) is (c, 0).

Next, a description will be given of a second detecting method in which configuration of the accumulated addition table is previously detected and then the vertical moving vector (g) is found from the minimum value in the vertical accumulated addition table $D_x$ and the horizontal moving vector (h) is found from the minimum value in the horizontal accumulated addition table $D_y$.

When the accumulated addition table having the form of inverted cone as shown in FIG. 11(a) moves by c in the horizontal direction and by b in the vertical direction, the accumulated addition table is represented by the following equation, that is;

$$(x-c)^2+(y-b)^2=\{f(z)\}^2 \ (z>0)$$

If it is assumed that it has a perfect cone shape for simplicity, it follows that $f(z)=kz$. Therefore, the accumulated addition table can be represented as follows, that is;

$$(x-c)^2+(y-b)^2=(kz)^2 \ (z>0)$$

Since the vertical accumulated addition table 9 is one having the section at the plane x=0, it can be represented as follows, that is;

$$c^2+(y-b)^2=(kz)^2$$

When y=b, it follows that $z0=\pm c/k$ and then z is the minimum because of the following equation, that is;

$$z=\{c^2+(y-b)^2\}^{\frac{1}{2}}/k$$

Therefore, on the contrary, it is found that the horizontal moving vector (h) (c, 0) can be obtained when the minimum z0 of z is found.

More specifically, it is found that $c=\pm k\cdot z0$ and the horizontal moving vector is (k·z0, 0) or (−k·z0, 0). Then, either one can be determined by determining whether c is positive or negative value in reference to the horizontal accumulated addition table.

In addition, since the horizontal accumulated addition table 10 is one having the section at the plane y=0, it can be also represented as follows, that is;

$$(x-c)^2+b^2=(kz)^2$$

When x=c, it follows that $z0=\pm b/k$ and then z is the minimum because of the following equation, that is;

$$z=\{(x-c)^2+b^2\}^{\frac{1}{2}}/k$$

Therefore, on the contrary, it is found that the vertical moving vector (g) (0, b) is obtained when the minimum z0 of z is found.

More specifically, it is found that $b=\pm k\cdot z0$ and the moving vector is (0, k·z0) or (0, −k·z0). Then, either one can be determined by determining whether c is a positive or negative value in reference to the vertical accumulated addition table.

Although it is assumed that the accumulated addition table is in the form of perfect cone and a description was given of a case where $f(z)=kz$, the same can be found as the function of z in general. Although the function f(z) of z at this time varies with contents of the image at that time, since there is small variation in case of continuous video signals, it is always possible to find f(z) by detecting the configuration of the accumulated addition table every frame.

FIGS. 12(a) and 12(b) are a view showing an ideal horizontal accumulated addition table, which shows a steep hyperbolic curve when movement in a diagonal direction is small as shown in FIG. 12(a), and shows a gentle hyperbolic curve when movement in a diagonal direction is large.

Figure 12:
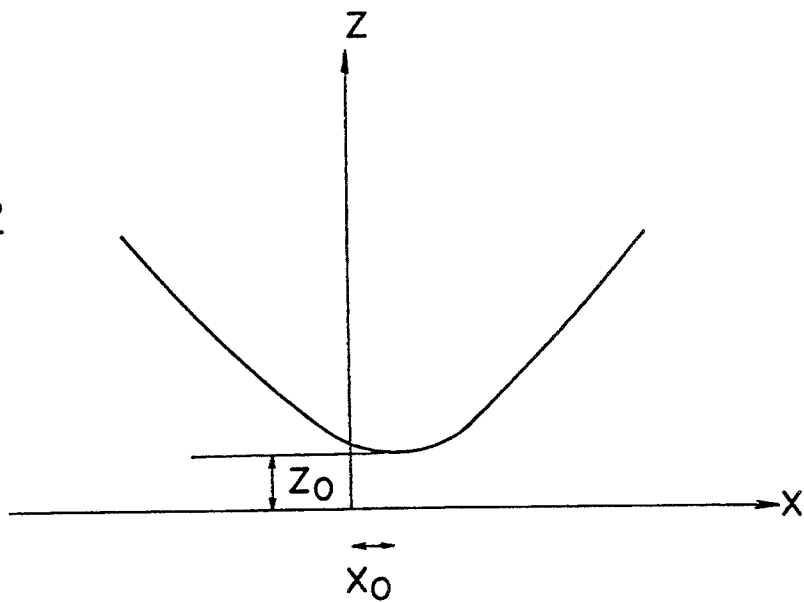
FIGS. 12a and 12b are views showing a horizontal accumulated addition table.
Figure 12:
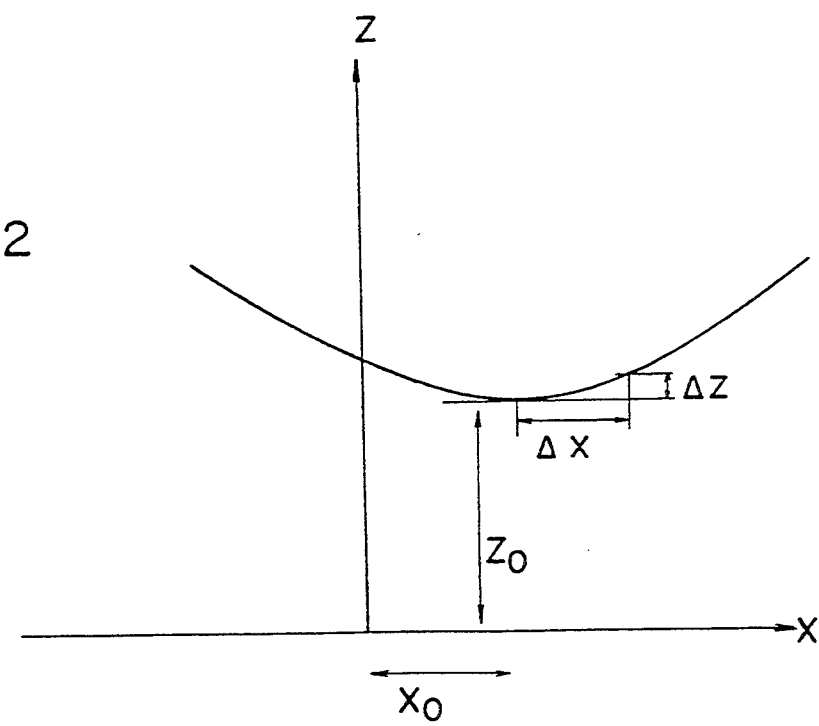

On the other hand, referring to FIG. 12, the first method is that x0 when z is the minimum is detected and the horizontal moving vector is found from this x0. Further, the second method is that the minimum value z0 of z is detected and then the vertical moving vector is found from this z0.

In case of an actual horizontal accumulated addition table, an error of Δz in the direction of z exists because of a quantization error, a round-off error, a difference in horizontal correlation level of the image or the like. Therefore, an error of Δx is also generated in x at this time. In case of the gentle hyperbolic curve as shown in FIG. 12(b), since Δx is large, detecting precision of x is low. However since z0 is large, detecting precision of z is improved.

Since the same is also applied in the vertical accumulated addition table, the second detecting method is more effective than the first detecting method when movement in the diagonal direction is large as shown in FIG. 12(b).

Although the first and second detecting methods of one-dimensional vector detecting device was described, a final result can be obtained by adding the detected results of the first and second embodiments at a prescribed ratio, or either one can be selected in accordance with the configuration of the accumulated addition table.

Figure 13:
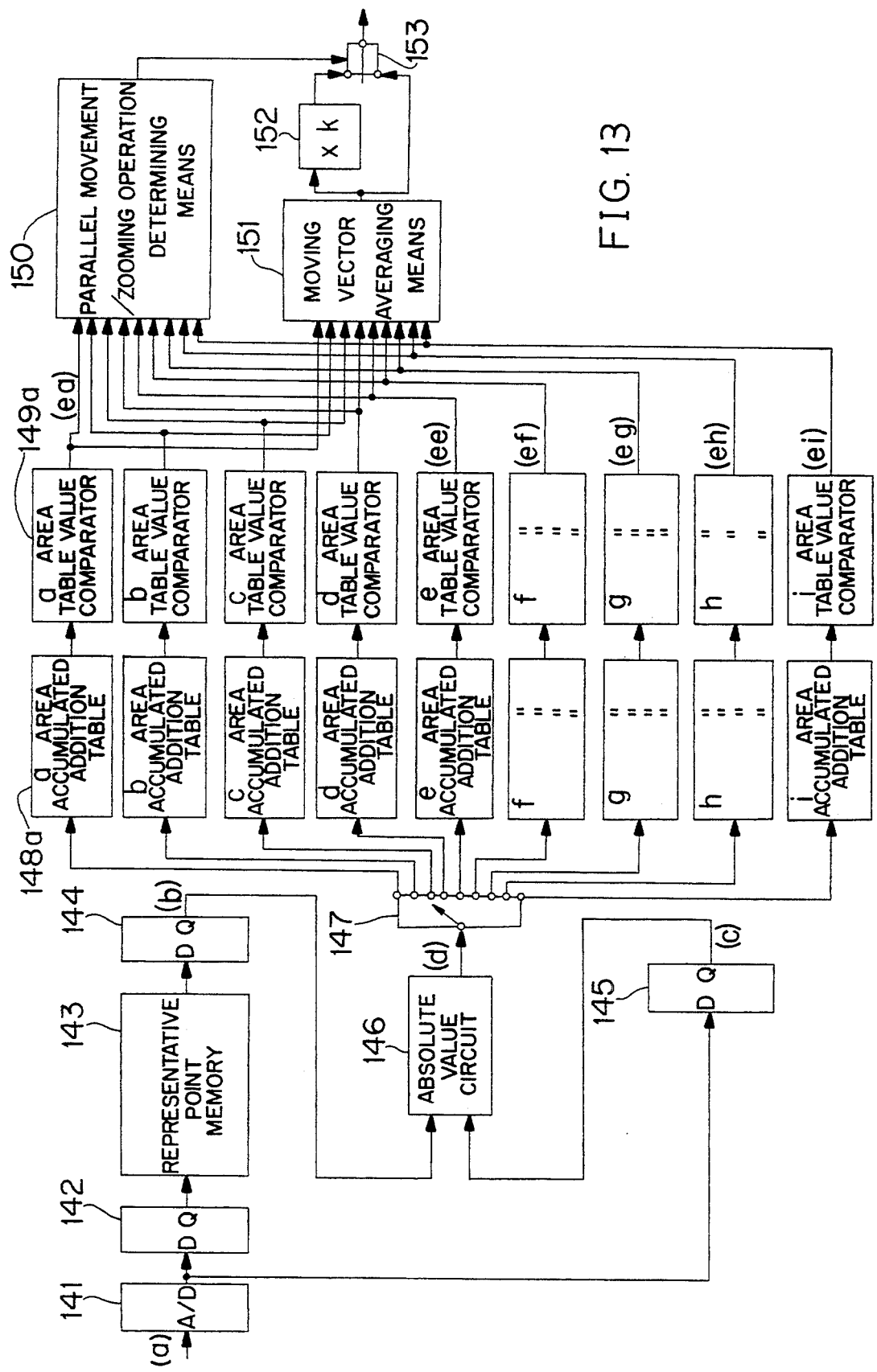
FIG. 13 is a block diagram showing a moving vector detecting apparatus in accordance with a third embodiment of the present invention.

FIG. 13 is a block diagram showing a representative point calculating circuit in the image blur correcting apparatus in accordance with a third embodiment of the present invention, which solves the problems of the moving vector detecting circuit in FIG. 4 in which moving vector cannot be successfully detected when the image is one at the time of zooming operation.

In FIG. 13, an input video signal (a) which is a video signal formed by the video signal processing circuit 10 is A/D converted by an A/D converter 141 first, and then one of the A/D converted signals is input to a representative memory 143 through a latch circuit 142. A prescribed pixel in a block written in this memory becomes a representative point. Therefore, an output from the representative memory 143 is the representative point written one frame before, which is read every block and becomes a signal b through a latch circuit 144. The absolute value of the difference between the signal (c) which is the other A/D converted video signal input to this block and passed through a latch circuit 145 and the representative point signal (b) is calculated by an absolute value circuit 406. Reference numeral 147 designates a switch through which the result of the absolute value circuit 146 is output to one of accumulated addition tables 148a to 148i of each area and reference numeral 150 designates parallel movement/zooming operation determining device for determining parallel movement or zooming operation from an output of each of table value comparators 149a to 149i at each area. Reference numeral 151 designates a moving vector averaging device for finding an average value of the outputs of the table value comparators 149a to 149i, reference numeral 152 designates a multiplying circuit which multiplies k ($0 \leq k < 1$) and reference numeral 153 designates a switch.

Figure 14:
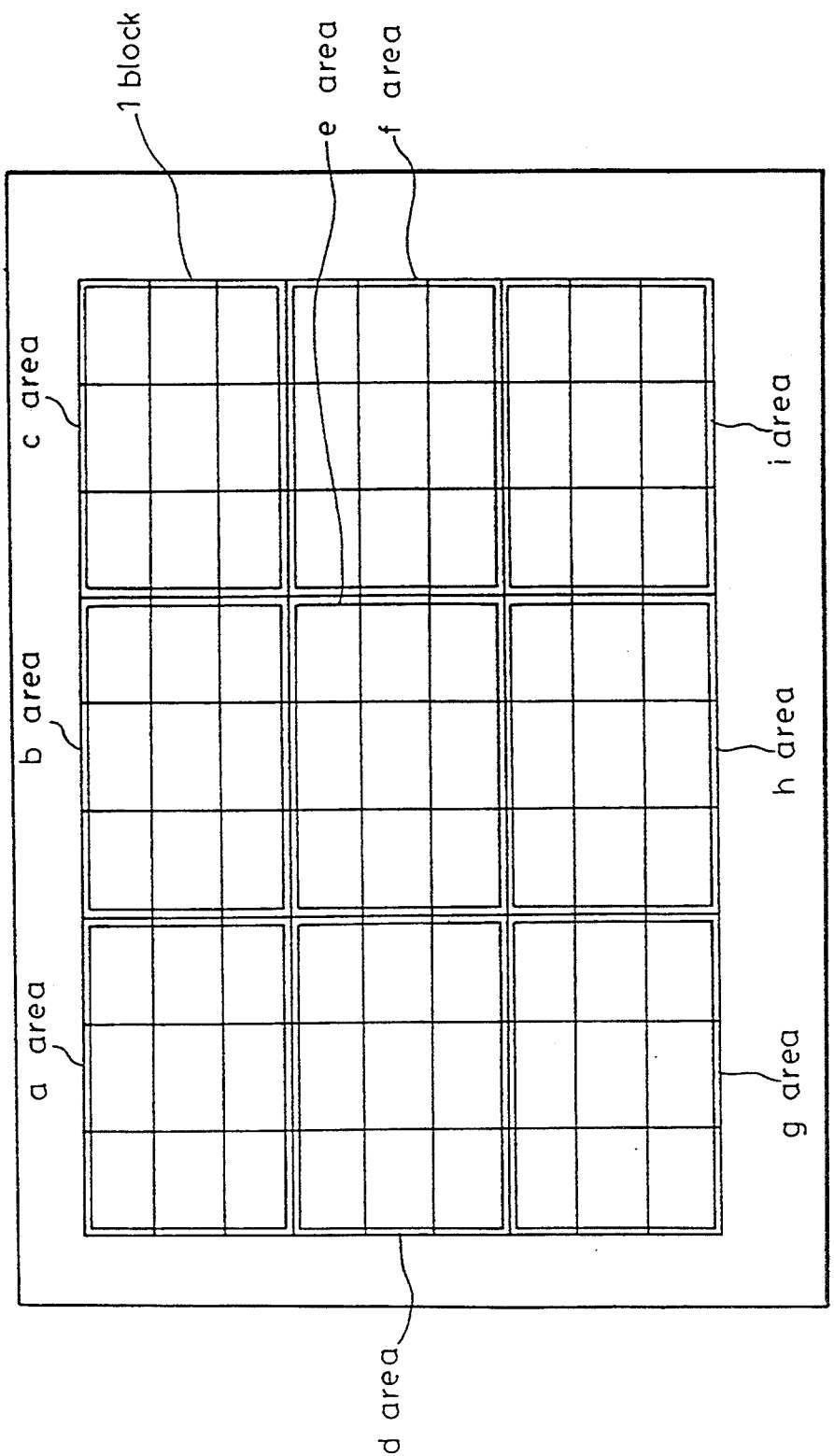
FIG. 14 is a view showing an example of the relationship between a block and an area.
Figure 16:
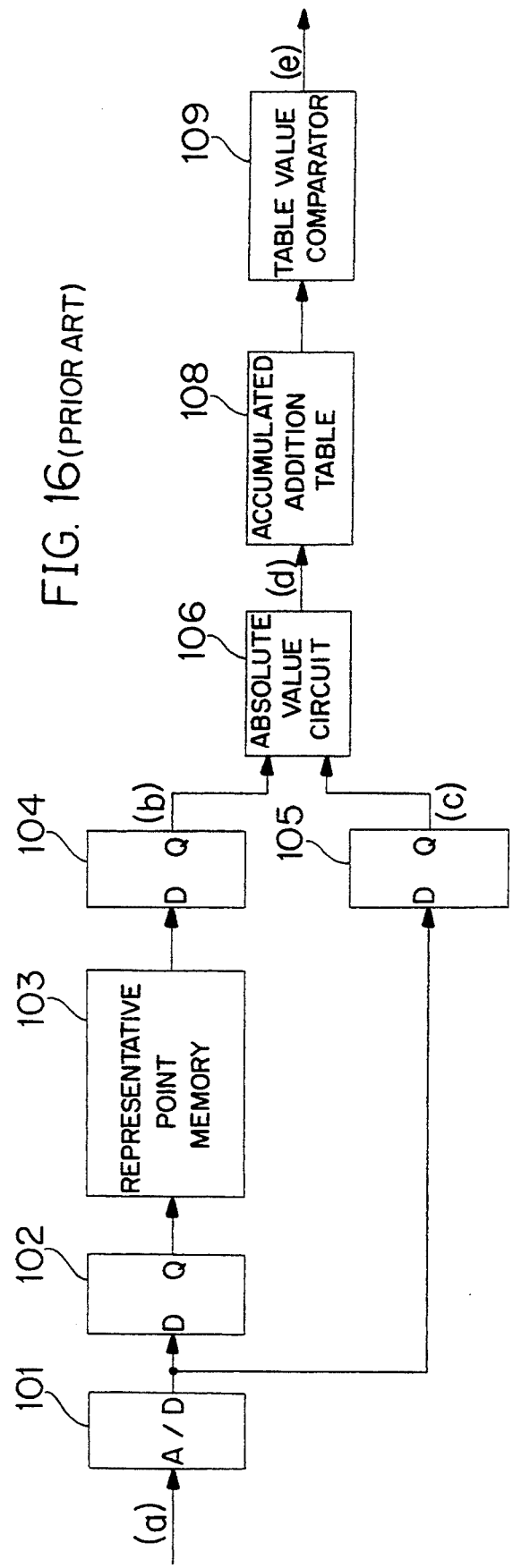
FIG. 16 is a block diagram showing a general representative point calculating circuit.
Figure 17A:
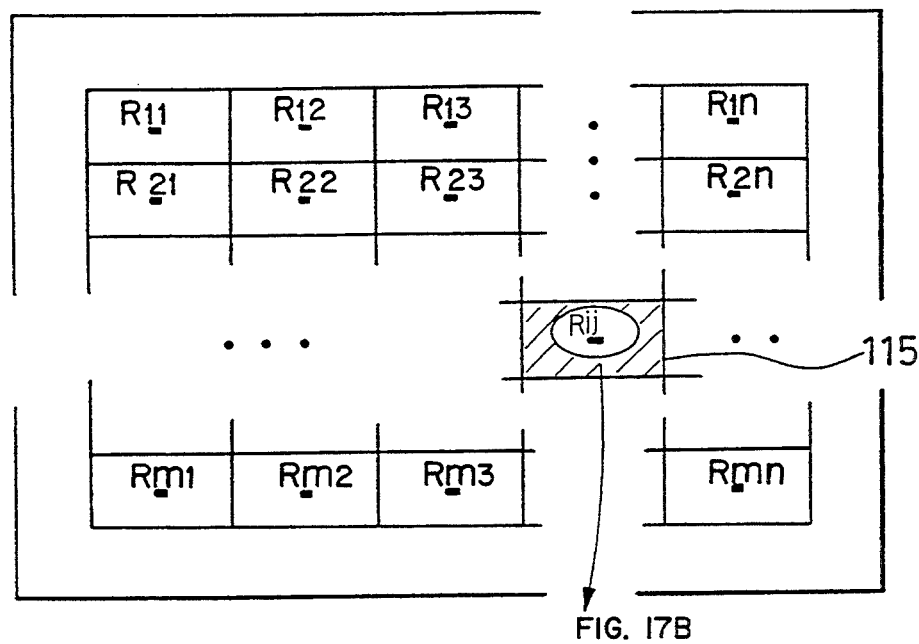
FIG. 17A-17B show the relationship between a block and a representative point in an image, in a conventional example.
Figure 17B:
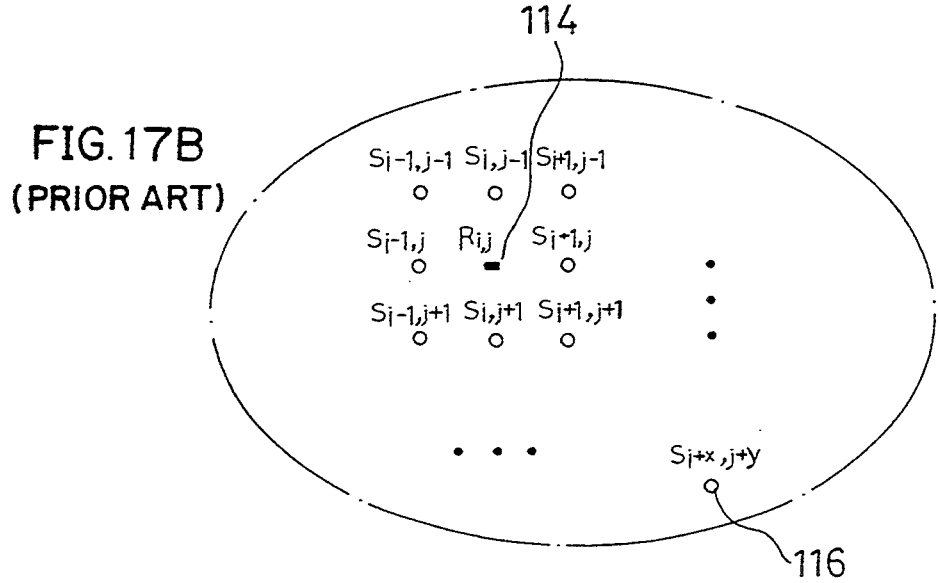

FIG. 14 is a view showing the relationship between the block and the area in which one screen is divided into 81 (=9×9) blocks and one area is divided into 9 (=3×3) blocks, that is, one screen is divided into 9 (=3×3) a to i areas. FIG. 15 are views for describing the parallel movement/zooming operation determining process.

Next, operation thereof will be described hereinafter.

The input video signal (a) is A/D converted by the A/D converter 141 and a prescribed pixel to become the representative point 14 in the block 15 is written in the representative memory 143 through the latch circuit 142. Further, the absolute value of the difference between the representative signal (b) in the previous frame output from the latch circuit 144 and the video signal (c) in the present frame output from the latch circuit 145 is calculated by the absolute value circuit 146. The above is the same as before. These calculations are made for each block. The output signal (d) of the absolute value circuit 146 is switched by the switch 147 and then added, one after another, to a table corresponding to each pixel of 9 accumulated addition tables 148a to 148i each corresponding to each area comprising the blocks.

The result of addition at the table of each area is input to each of the table value comparators 149a to 149i in each area. Finally, it is found that how far and in which direction the image position moved for one frame by a block address in which the addition result is the minimum in each area, that is, 9 moving vector values e, a, ..., ei are found at each of 9 areas.

These 9 moving vector values are averaged by moving vector averaging means 151. One average value is input to the switch 153 as is, and the other passes through the multiplying circuit 152 multiplying k ($0 \leq k < 1$) to be attenuated and then input to the switch 153.

On the other hand, these 9 moving vector values are input to the parallel movement/zooming operation determining device 150 and when parallel movement is determined, the switch 153 is switched so that the output of the moving vector averaging device 11 may be the moving vector as it is. However, when zooming operation is determined, the switch 153 is switched so that the output of the multiplying circuit 152 may be the moving vector.

Next, operation of the parallel movement/zooming operation determining means 150 will be described in reference to FIGS. 15(a)–(b). Referring to FIG. 15(a), although the moving vectors of a area to i area have a little variation, their x and y directions are both positive values and close to the average value of the vector, so that the parallel movement is determined. Therefore, in this case, the switch 13 is switched so that the output (2, 2) from the moving vector averaging device 151 may be the moving vector as it is.

On the other hand, referring to FIG. 15(b), since the moving vectors of a area and i area, c area and g area, b area and h area, and d area and f area are almost oppositely directed, respectively, it is determined that they are under zooming operation. Therefore, in this case the switch 153 is switched so that the output (k·5/9, 0) from the multiplying circuit 152 may be the moving vector.

Although movement of the screen is detected between frames in the above embodiment, it can also be detected between fields.

As described above, according to the image blur correcting apparatus of the present invention, the blur of the image is detected by electrically processing image information and then an optical axis is corrected by rotating the lens-barrel part in accordance with the above detected output. Therefore, when the blur of the image is detected, an expensive gyro sensor is not necessary and also an expensive A/D converter, D/A converter, memory or the like is not necessary. Thus, the result is that the image blur correcting apparatus is inexpensive and has a low power consumption.

In addition, according to the present invention, pixels to be compared with a representative point in a block are only positioned on the upper, lower, right and left sides of the representative point. Then two one-dimensional vectors of a vertical moving vector and horizontal moving vector are individually calculated from the minimum tables of the vertical accumulated addition table obtained from the upper and lower parts, and the horizontal accumulated addition table obtained from the right and left parts, and then a two-dimensional moving vector is calculated from the above two intersecting one-dimensional vectors of the vertical moving vector and the horizontal moving vector. As a result, the moving vector can be detected with a few accumulated addition tables in a short calculating time.

Furthermore, according to the present invention, the moving vector is detected not by averaging the movement in the whole screen, but by detecting moving vector every area obtained by dividing the screen, and determining whether the whole screen moves in parallel or it is in course of the zooming operation. This is determined from a fact that the moving vector in each area is directed to the same direction or a fact that they are directed to the opposite direction to each other. Then when the zooming operation is determined, the value obtained by multiplying the average of the moving vectors of the whole screen by a prescribed attenuation constant becomes the moving vector. As a result, there is provided the vector detecting apparatus capable of detecting a moving vector which does not look strange for the user, even when zooming operation, which is often used during shooting, is performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image blur correcting apparatus comprising:
   a lens-barrel part including a lens and an imaging device;
   image signal processing means for forming a video signal from an electrical signal obtained at said imaging device;
   a supporting body for supporting said lens-barrel part in a freely pivoting manner around a rotating axis crossing a beam axis incident to said lens-barrel part at approximately right angles;
   actuator means, attached between said lens-barrel part and said supporting body, for rotating said lens-barrel part;
   relative angle detecting means for detecting a relative angle between said lens-barrel part and said supporting body;
   means for detecting a moving vector indicating an amount of blur of the image from correlation between two fields of image information from said image signal processing means, which are continuous in view of time;
   angular velocity operating means for calculating rotation angular velocity using a zoom multiplying factor from the detected moving vector; and
   calculating controlling means for outputting a control signal of an actuator in accordance with outputs of said relative angle detecting means and said angular velocity detecting means;
   wherein the amount of blur of the image is determined in both a pitch and yaw direction.

2. The image blur correcting apparatus of claim 1, wherein the two fields are in the same frame.

3. The image blur correcting apparatus of claim 1, wherein the two fields are in adjacent frames.

4. A video camera, including the image blur correcting apparatus of claim 1.

5. The image blur correcting apparatus of claim 1, said actuator means including,
   back yoke means including a magnet, attached to said lens-barrel part, for generating a field magnetic flux,
   coil yoke means including a coil yoke, attached to said supporting body, and
   relative difference means for detecting the field magnetic flux and for generating electrical signals representative of a relative difference between an angle of said magnet and an angle of said coil yoke.

6. The image blur correcting apparatus of claim 5, wherein said relative difference means is a Hall element.

7. The image blur correcting apparatus of claim 5, said relative angle detecting means including,
   differential amplifying means or amplifying the electrical signals generated by said relative difference means, and
   biasing means for biasing the amplified electrical signals to determine the relative angle between said lens-barrel part and said supporting body.

8. The image blur correcting apparatus of claim 1, said means for detecting including,
   A/D converting means for receiving and A/D converting the video signal from said image signal processing means, to produce a digital signal,
   latching means for delaying all pixels of the digital signal,
   representative point memory means for selecting a representative pixel from all the pixels of the digital signal, to produce a representative point signal,
   absolute value means for calculating an absolute value of a difference between the representative point signal and the delayed digital signal for each of a plurality of blocks which comprise the image,
   accumulated addition storing means for storing the absolute value, calculated for each of the plurality of blocks, and
   comparing means for comparing the absolute values for each of the plurality of blocks and generating the moving vector indicating the amount of blur of the image.

9. The image blur correcting apparatus of claim 8, wherein said latching means delays all pixels of the digital signal by one frame.

10. The image blur correcting apparatus of claim 9, wherein the absolute value of the difference between the representative port signal and the delayed digital signal for each of the plurality of blocks is represented by:

$$Dxy = \sum_{ij} |R_{ij} - S_{i+x, j+y}|$$

Where:
   Dxy = the absolute value of the difference for each of the plurality of blocks,
   $R_{ij}$ = data of the representation pixel
   $S_{i+x, j+y}$ = data of a pixel of the delayed digital signal.

11. The image blur correcting apparatus of claim 10, wherein the moving vector is obtained by averaging movement of the entire image.

12. The image blur correcting apparatus of claim 11, wherein the moving vector is obtained by adding each of the representation pixels for each of the plurality of blocks of the image in order to average the movement of the entire image.

13. The image blur correcting apparatus of claim 1, said means for detecting including,
   A/D connecting means for receiving and A/D converting the video signal from said image signal processing means to produce a digital signal,
   latching means for delaying all pixels of the digital signal,
   representative point memory means for selecting a representative pixel from all the pixels of the digital signal to produce a representative point signal,
   absolute value means for calculating an absolute value of a difference between the representative point signal and the delayed digital signal for each of a plurality of blocks which comprise the image,
   dividing means for dividing each of the plurality of blocks into a plurality of areas, each of the plurality of areas having a corresponding accumulation table,
   accumulation means for adding the absolute value of the difference between the representative point signal and the delayed digital signal for each of the plurality of blocks to a plurality of table value comparing means, one for each of the plurality of areas, to produce a plurality of moving vector values, moving vector means for averaging the plurality of moving vector values, multiplying means for multiplying the average by a predetermined value, parallel movement/zooming operation determining means for receiving the plurality of moving vector values and detecting parallel movement or a zooming operation of the image, and switching means for setting the moving vector equal to the average of the plurality of moving vector values calculated by said moving vector means when parallel movement is detected by said parallel movement/zooming operation detecting means and for setting the moving vector equal to the multiplied average, calculated by said multiplying means when the zooming operation is detected by said parallel movement/zooming operation determining means.

14. The image blur correcting apparatus of claim 13, wherein said parallel movement/zooming operation determining means determines the image has parallel movement when a direction and a magnitude of each of the plurality of moving vector values approximates a direction and a magnitude of the average of the plurality of moving vector values and determines the zooming operation has been performed on the image when the directions of the plurality of moving vector values are varied.

15. The image blur correcting apparatus of claim 13, wherein said latching means delays all pixels of the digital signal by one frame.

16. The image blur correcting apparatus of claim 15, wherein the absolute value of the difference between the representative point signal and the delayed digital signal for each of the plurality of blocks is represented by:

$$Dxy = \sum_{ij} |R_{ij} - S_{i+x,j+y}|$$

Where:
Dxy = the absolute value of the difference for each of the plurality of blocks,
$R_{ij}$ = data of the representation pixel,
$S_{i+x,j+y}$ = data of a pixel of the delayed digital signal.

17. The image blur correcting apparatus of claim 16, wherein the moving vector is obtained by averaging movement of the entire image.

18. The image blur correcting apparatus of claim 17, wherein the moving vector is obtained by adding each of the representation pixels for each of the plurality of blocks of the image in order to average the movement of the entire image.

19. The image blur correcting apparatus of claim 1, said means for detecting including, A/D converting means for receiving and A/D converting the video signal from said image signal processing means to produce a digital signal, latching means for delaying all pixels of the digital signal, representative point memory means for selecting a representative pixel from all the pixels of the digital signal to produce a representative point signal, vertical and horizontal absolute value means for calculating a vertical and horizontal absolute value, respectively, the vertical and horizontal absolute values representing a difference between a vertical and horizontal component of the representative point signal and a vertical and horizontal component of the delayed digital signal, respectively, for each of a plurality of blocks which comprise the image, vertical and horizontal accumulated addition tables for storing the vertical and horizontal absolute values, respectively, calculated for each of the plurality of blocks, one-dimensional vector detecting means for detecting a vertical vector and an intersecting horizontal vector from the vertical and horizontal absolute values stored in said vertical and horizontal accumulated addition tables, respectively, and two dimensional vector detecting means for detecting the moving vector from the vertical vector and the intersecting horizontal vector.

20. The image blur correcting apparatus of claim 19, wherein the vertical and horizontal accumulation tables form an inverted cone with an apex at (c,b,0) wherein an X-axis represents a horizontal directional, a Y-axis represents a vertical direction, and a z-axis represents an accumulation table value and the moving vector includes a vertical moving vector represented by (0,b) and a horizontal moving vector represented by (c,0).

21. The image blur correcting apparatus of claim 19, wherein the vertical and horizontal accumulation tables form an inverted cone with an apex at (c,b,0) wherein an X-axis represents a horizontal direction, a Y-axis represents a vertical direction, and a Z-axis represents an accumulation table value and the vertical and horizontal accumulation tables are represented by $$(X-c)^2 + (y-b)^2 = (kz)^2 (z>0)$$

where Kz = a predetermined function and
the moving vector includes a vertical moving vector represented by (0,±K·min Z) and a horizontal moving vector represented by (±K·min Z, 0).

22. The image blur correcting apparatus of claim 19, wherein said latching means delays all pixels of the digital signal by one frame.

23. The image blur correcting apparatus of claim 22, wherein the vertical and horizontal absolute values which represent the difference between the vertical and horizontal components of the representative point signal and the vertical and horizontal components of the delayed digital signal for each of the plurality of blocks, are represented by:

$$Dx = \Sigma |R_{ij} - S_{i,j+y}|$$

$$Dy = \Sigma |R_{ij} - S_{i+x,j}|$$

where:
Dx = the horizontal absolute value for each of the plurality of blocks,
Dy = the vertical absolute value for each of the plurality of blocks,
$R_{ij}$ = data of the representative pixel,
$S_{i,j+y}$ = data of a pixel of the delayed digital signal in a y-z plane, and
$S_{i+x,j}$ = data of a pixel of the delayed signal in a x-z plane.

24. The image blur correcting apparatus of claim 23, wherein the moving vector is obtained by averaging movement of the entire image.

25. The image blur correcting apparatus of claim 24, wherein the moving vector is obtained by adding each of the representation pixels for each of the plurality of blocks of the image in order to average the movement of the entire image.

26. A video camera comprising:
an image blur correcting apparatus in which moving vectors of the whole screen are detected from an amount of movement of a pixel in each block, based upon representative points set in a plurality of blocks in an image, in order to detect an amount of movement between frames of the image, said image blur correcting apparatus including:
means for calculating an absolute value of a difference between a pixel of a representative point for each block of the frame directly, before a frame whose movement vector is to be detected, and the pixels on a horizontal straight line and a vertical straight line passing through the representative point, respectively, of the frame whose movement vector is to be detected;
horizontal and vertical accumulated addition means for accumulatedly adding horizontal and vertical absolute values calculated;
means for detecting two intersecting one-dimensional moving vectors from the horizontal and vertical accumulated added values; and
means for calculating a two-dimensional moving vector from said two intersecting one-dimensional moving vectors.

27. The video camera of claim 26, wherein said one-dimensional moving vector detecting means detects moving vectors in a horizontal and vertical direction, based upon coordinates of a minimum accumulated addition value of said horizontal and vertical accumulated addition means.

28. The video camera of claim 26, wherein said one-dimensional moving vector detecting means obtains a curved surface representing the accumulated added values from the accumulated addition means, detects a point closest to an XY plane on the curved surface, and obtains moving vectors in the horizontal and vertical direction, based upon coordinates of the closest point.

29. A video camera comprising:
an image blur correcting apparatus including,
means for selecting a representative point in a first of two continuous screens, for dividing a second of the two continuous screens into a plurality of blocks, and finding an absolute value of a difference between the representative point and each of the plurality of blocks;
means for dividing each of the plurality of blocks into a plurality of areas and for calculating a table by adding the absolute value of the difference for each of the plurality of areas for each of the corresponding plurality of blocks to said table;
means for finding a moving vector in each of the plurality of areas from said table accumulated for each of the plurality of areas;
parallel movement/zooming operation determining means for determining whether each of the plurality of areas of the second of two continuous screens are moving parallel to each other or if the second of the two continuous screens is moving according to a zooming operation, depending on a moving vector determined for each of the plurality of areas; and
means for outputting a screen moving vector, having a value obtained by averaging the moving vectors of each of the plurality of areas for the second of the two continuous screens when said parallel movement/zooming operation determining means determines the second of the two continuous screens is moving in parallel and for outputting the screen moving vector having a value obtained by multiplying an average value of the second of the two continuous screens by a prescribed attenuation constant K ($0 \leq k < 1$) when said means determines the second of the two continuous screens to be moving according to a zooming operation.

30. The video camera of claim 29, wherein the second of the two continuous screens is divided into nine blocks.

31. The video camera of claim 30, wherein said parallel movement/zooming operation determining means determines parallel movement when the moving vector of each of the plurality of areas is in the same direction.

32. The video camera of claim 30, wherein said parallel movement/zooming operation determining means determines the second of the two continuous screens to be in a zooming operation when the moving vector of the plurality of areas have different directions.

33. A video camera comprising:
an image blur correcting apparatus including,
a lens-barrel part having a lens and an imaging device;
image signal processing means for forming a video signal from an electrical signal obtained at said imaging device;
a supporting body for supporting said lens-barrel part in a freely pivoting manner around a rotating axis crossing a beam axis incident to said lens-barrel part at approximately right angles;
actuator means, attached between said lens-barrel part and said supporting body, for rotating said lens-barrel part;
relative angle detecting means for detecting a relative angle between said lens-barrel part and said supporting body;
means for detecting a moving vector indicating an amount of blur of the image from correlation between two frames, which are continuous in view of time, of image information from said image signal processing means;
angular velocity operating means for calculating rotation angular velocity using a zoom multiplying factor from the detected moving vector; and
calculating controlling means for outputting a control signal of an actuator in accordance with outputs of said relative angle detecting means and said angular velocity detecting means.

34. An image blur converting apparatus comprising:
a moving vector detecting apparatus in which moving vectors of at least a part of the screen are detected from an amount of movement of a pixel in each block, based upon representative points set in a plurality of blocks in an image, in order to detect an amount of movement between at least one of frames and fields of the image, said moving vector detecting apparatus including,
means for detecting two intersecting one-dimensional moving vectors from vertical accumulated addition tables corresponding to pixels on a vertical straight line passing through a representative point, and from horizontal accumulated addition tables corresponding to pixels on a horizontal straight line passing through the representative point, and means for calculating a two-dimensional moving vector from said two intersecting one-dimensional moving vectors.

35. A video camera including the image blur correcting apparatus of claim 34.

36. The image blur correcting apparatus of claim 34, wherein the fields are in the same frame.

37. The image blur correcting apparatus of claim 34, wherein the fields are in adjacent frames.

38. A moving vector detector, comprising:

representative point memory means for selecting a representative pixel from all pixels of a digital signal, to produce a representative point signal, absolute value means for calculating an absolute value of a difference between the representative point signal and delayed digital signal for each of a plurality of blocks which comprise an image, accumulated addition storing means for storing the absolute value, calculated for each of the plurality of blocks, and comparing means for comparing the absolute values for each of the plurality of blocks and generating a moving vector indicating an amount of blur of the image.

39. A video camera including the moving vector detector of claim 38.

40. An image blur correcting apparatus including the moving vector detector of claim 38.

41. The moving vector detector of claim 40, wherein the absolute value of the difference between the representative point signal and the delayed digital signal for each of the plurality of blocks is represented by:

$$Dxy = \sum_{ij} |R_{ij} - S_{i+x,j+y}|$$

where:

Dxy = the absolute value of the difference for each of the plurality of blocks, $R_{ij}$ = data of the representation pixel $S_{i+x,j+y}$ = data of a pixel of the delayed digital signal.

42. The moving vector detector of claim 41, wherein the moving vector is obtained by averaging movement of the entire image.

43. The moving vector detector of claim 42, wherein the moving vector is obtained by adding each of the representation pixels for each of the plurality of blocks of the image in order to average the movement of the entire image.

44. A moving vector detector, comprising:

representative point memory means for selecting a representative pixel from all pixels of a digital signal to produce a representative point signal, vertical and horizontal absolute value means for calculating a vertical and horizontal absolute value, respectively, the vertical and horizontal absolute values representing a difference between a vertical and horizontal component of the representative point signal and a vertical and horizontal component of a delayed digital signal, respectively, for each of a plurality of blocks which comprise an image, vertical and horizontal accumulated addition tables for storing the vertical and horizontal absolute values, respectively, calculated for each of the plurality of blocks, one-dimensional vector detecting means for detecting a vertical vector and an intersecting horizontal vector from the vertical and horizontal absolute values stored in said vertical and horizontal accumulated addition tables, respectively, and two dimensional vector detecting means for detecting a moving vector from the vertical vector and the intersecting horizontal vector.

45. An image blur correcting apparatus including the moving vector detector of claim 44.

46. A video camera including the moving vector detector of claim 44.

47. The moving vector detector of claim 44, wherein the vertical and horizontal accumulation tables form an inverted cone with an apex at (c,b,0) wherein an X-axis represents a horizontal directional, a Y-axis represents a vertical direction, and a z-axis represents an accumulation table value and the moving vector includes a vertical moving vector represented by (0,b) and a horizontal moving vector represented by (c,0).

48. The moving vector detector of claim 44, wherein the vertical and horizontal accumulation tables form an inverted cone with an apex at (c,b,0) wherein an X-axis represents a horizontal direction, a Y-axis represents a vertical direction, and a Z-axis represents an accumulation table value and the vertical and horizontal accumulation tables are represented by $$(X-c)^2+(y-b)^2=(kz)^2 \ (z>0)$$

where Kz = a predetermined function and the moving vector includes a vertical moving vector represented by (0,±K·min Z) and a horizontal moving vector represented by (±K·min Z, 0).

49. The moving vector detector of claim 44, wherein the vertical and horizontal absolute values which represent the difference between the vertical and horizontal components of the representative point signal and the vertical and horizontal components of the delayed digital signal for each of the plurality of blocks, are represented by:

$$Dx=\Sigma |R_{ij}-S_{i,j+y}|$$

$$Dy=\Sigma |R_{ij}-S_{i+x,j}|$$

where:

Dx = the horizontal absolute value for each of the plurality of blocks,

Dy = the vertical absolute value for each of the plurality of blocks, $R_{ij}$ = data of the representative pixel, $S_{i,j+y}$ = data of a pixel of the delayed digital signal in a y-z plane, and $S_{i+x,j}$ = data of a pixel of the delayed signal in a x-z plane.

50. The moving vector detector of claim 49, wherein the moving vector is obtained by averaging movement of the entire image.

51. The moving vector detector of claim 50, wherein the moving vector is obtained by adding each of the representation pixels for each of the plurality of blocks of the image in order to average the movement of the entire image.

52. A moving vector detector, comprising:

representative point memory means for selecting a representative pixel from all pixels of a digital signal to produce a representative point signal, absolute value means for calculating an absolute value of a difference between the representative point signal and a delayed digital signal for each of a plurality of blocks which comprise an image, dividing means for dividing each of the plurality of blocks into a plurality of areas, each of the plurality of areas having a corresponding accumulation table, accumulation means for adding the absolute value of the difference between the representative point signal and the delayed digital signal for each of the plurality of blocks to a plurality of table value comparing means, one for each of the plurality of areas, to produce a plurality of moving vector values, moving vector means for averaging the plurality of moving vector values, multiplying means for multiplying the average by a predetermined value, parallel movement/zooming operation determining means for receiving the plurality of moving vector values and detecting parallel movement or a zooming operation of the image, and switching means for setting the moving vector equal to the average of the plurality of moving vector values calculated by said moving vector means when parallel movement is detected by said parallel movement/zooming operation detecting means and for setting the moving vector equal to the multiplied average, calculated by said multiplying means when the zooming operation is detected by said parallel movement/zooming operation determining means.

53. An image blur correcting apparatus including the moving vector detector of claim 52.

54. A video camera including the moving vector detector of claim 52.

55. The moving vector detector of claim 52, wherein said parallel movement/zooming operation determining means determines the image has parallel movement when a direction and a magnitude of each of the plurality of moving vector values approximates a direction and a magnitude of the average of the plurality of moving vector values and determines the zooming operation has been performed on the image when the directions of the plurality of moving vector values are varied.

56. The moving vector detector of claim 52, wherein the absolute value of the difference between the representative point signal and the delayed digital signal for each of the plurality of blocks is represented by:

$$Dxy = \sum_{ij} |R_{ij} - S_{i+x,j+y}|$$

Where:
Dxy = the absolute value of the difference for each of the plurality of blocks,
$R_{ij}$ = data of the representation pixel,
$S_{i+x,j+y}$ = data of a pixel of the delayed digital signal.

57. The moving vector detector of claim 56, wherein the moving vector is obtained by averaging movement of the entire image.

58. The moving vector detector of claim 57, wherein the moving vector is obtained by adding each of the representation pixels for each of the plurality of blocks of the image in order to average the movement of the entire image.

* * * * *